US012725539B2

(12) United States Patent
Wu et al.

(10) Patent No.: US 12,725,539 B2
(45) Date of Patent: Sep. 1, 2026

(54) ELECTRONIC DEVICE

(71) Applicant: InnoLux Corporation, Miao-Li County (TW)

(72) Inventors: Yuan-Lin Wu, Miao-Li County (TW); Tsung-Han Tsai, Miao-Li County (TW); Kuan-Feng Lee, Miao-Li County (TW)

(73) Assignee: InnoLux Corporation, Miao-Li County (TW)

(*) Notice: Subject to any disclaimer, the term of this patent is extended or adjusted under 35 U.S.C. 154(b) by 69 days.

(21) Appl. No.: 18/983,383

(22) Filed: Dec. 17, 2024

(65) Prior Publication Data

US 2025/0118229 A1 Apr. 10, 2025

Related U.S. Application Data

(63) Continuation of application No. 18/376,825, filed on Oct. 4, 2023, now Pat. No. 12,205,499, which is a continuation of application No. 17/525,985, filed on Nov. 15, 2021, now Pat. No. 11,810,482.

(30) Foreign Application Priority Data

Dec. 15, 2020 (CN) ......................... 202011478448.6

(51) Int. Cl.
*G09F 9/30* (2006.01)

(52) U.S. Cl.
CPC .................................... *G09F 9/301* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,194,543 | B2 * | 1/2019 | Seo | G09F 9/301 |
| 10,295,818 | B2 | 5/2019 | Nam et al. | |
| 10,531,582 | B2 * | 1/2020 | Park | G09F 9/301 |
| 10,789,863 | B2 * | 9/2020 | Song | H05K 1/028 |
| 11,792,945 | B2 * | 10/2023 | Yao | H05K 5/0217 361/749 |
| 11,810,482 | B2 * | 11/2023 | Wu | G06F 1/1635 |
| 12,205,499 | B2 * | 1/2025 | Wu | G06F 1/1652 |
| 12,266,277 | B2 * | 4/2025 | Wu | G06F 1/20 |
| 2018/0103552 | A1 * | 4/2018 | Seo | G09F 9/301 |

(Continued)

FOREIGN PATENT DOCUMENTS

| | | |
|---|---|---|
| KR | 10-2015-0061965 | 6/2015 |
| KR | 10-2018-0040181 | 4/2018 |

*Primary Examiner* — Lisa Lea-Edmonds
(74) *Attorney, Agent, or Firm* — Winston Hsu

(57) ABSTRACT

An electronic device includes a panel, a first support structure, and a second support structure. The panel has a first portion and a second portion. The first portion is rollable. The first support structure supports the panel and has a first region and a second region. The first region corresponds to the first portion and the second region corresponds to the second portion. The second support structure supports the second portion of the panel. The first support structure is disposed between the panel and the second support structure. The first support structure includes a plurality of openings in the first region, and an entity element in the first region and the second region. An area of the entity element is greater than an area of the second support structure.

10 Claims, 17 Drawing Sheets

(56) References Cited

U.S. PATENT DOCUMENTS

| | | | | |
|---|---|---|---|---|
| 2019/0207141 | A1 | 7/2019 | Kim | |
| 2020/0135065 | A1* | 4/2020 | Song | H05K 1/189 |
| 2022/0104369 | A1* | 3/2022 | Yao | H04M 1/0235 |
| 2022/0189348 | A1* | 6/2022 | Wu | G06F 1/1641 |
| 2022/0240400 | A1* | 7/2022 | Zhou | H05K 5/0217 |
| 2022/0326737 | A1* | 10/2022 | Ran | G06F 1/1652 |
| 2024/0029592 | A1* | 1/2024 | Wu | G06F 1/1652 |
| 2025/0118229 | A1* | 4/2025 | Wu | G09F 9/301 |

* cited by examiner

ELECTRONIC DEVICE

CROSS REFERENCE TO RELATED APPLICATIONS

This application is a continuation application of U.S. application Ser. No. 18/376,825, filed on Oct. 4, 2023, which is a continuation application of U.S. application Ser. No. 17/525,985, filed on Nov. 15, 2021. The contents of these applications are incorporated herein by reference.

BACKGROUND OF THE DISCLOSURE

1. Field of the Disclosure

The present disclosure relates to electronic devices, and more particularly to electronic devices having a rollable folding mold.

2. Description of the Prior Art

Currently, electronic products have become an indispensable necessity in modern society. With the fast development of the electronic products, consumers have more expectations on the quality, the function, or the price of these products. The conventional electronic products may have functions of illuminating, folding, touch control, or display, but still do not satisfy the requirements of users in all aspects.

SUMMARY OF THE DISCLOSURE

The present disclosure provides an electronic device, including a panel, a first support structure and a second support structure. The panel has a first portion and a second portion. The first portion is rollable. The first support structure supports the panel and has a first region and a second region. The first region corresponds to the first portion and the second region corresponds to the second portion. The second support structure supports the second portion of the panel. The first support structure is disposed between the panel and the second support structure. The first support structure includes a plurality of openings in the first region, and an entity element in the first region and the second region. An area of the entity element is greater than an area of the second support structure.

These and other objectives of the present disclosure will no doubt become obvious to those of ordinary skill in the art after reading the following detailed description of the embodiment that is illustrated in the various figures and drawings.

BRIEF DESCRIPTION OF THE DRAWINGS

FIGS. 1 to 6 are schematic diagrams illustrating an electronic device according to a first embodiment of the present disclosure, in which:

FIG. 1 shows a schematic top view of a display panel of the electronic device;

FIG. 2 shows schematic top views and cross-sectional views of a display panel of the electronic device from a folding mode to an unfolding mode;

FIG. 3 shows schematic top views and cross-sectional views of a display panel of the electronic device from another folding mode to an unfolding mode;

FIG. 4 shows a schematic diagram of one structure of a display panel of the electronic device;

FIG. 5 shows a schematic diagram of another structure of a display panel of the electronic device; and FIG. 6 shows a schematic cross-sectional view of a display panel of the electronic device.

FIGS. 7 to 9 are schematic diagrams illustrating an electronic device according to a second embodiment of the present disclosure, in which:

FIG. 7 shows a schematic cross-sectional view of a display panel of the electronic device;

FIG. 8 shows a schematic top view of a first support structure of the electronic device; and FIG. 9 shows schematic cross-sectional views of the first support structure of the electronic device along the section line E-E' and the section line F-F' of FIG. 8.

FIG. 16 and FIG. 17 are schematic diagrams illustrating an electronic device according to a ninth embodiment of the present disclosure, in which:

FIG. 16 is a schematic top view of a display panel of the electronic device in a unfolding mode; and FIG. 17 is a schematic cross-sectional view of the display panel of the electronic device in a folding mode.

DETAILED DESCRIPTION

Figure 1:
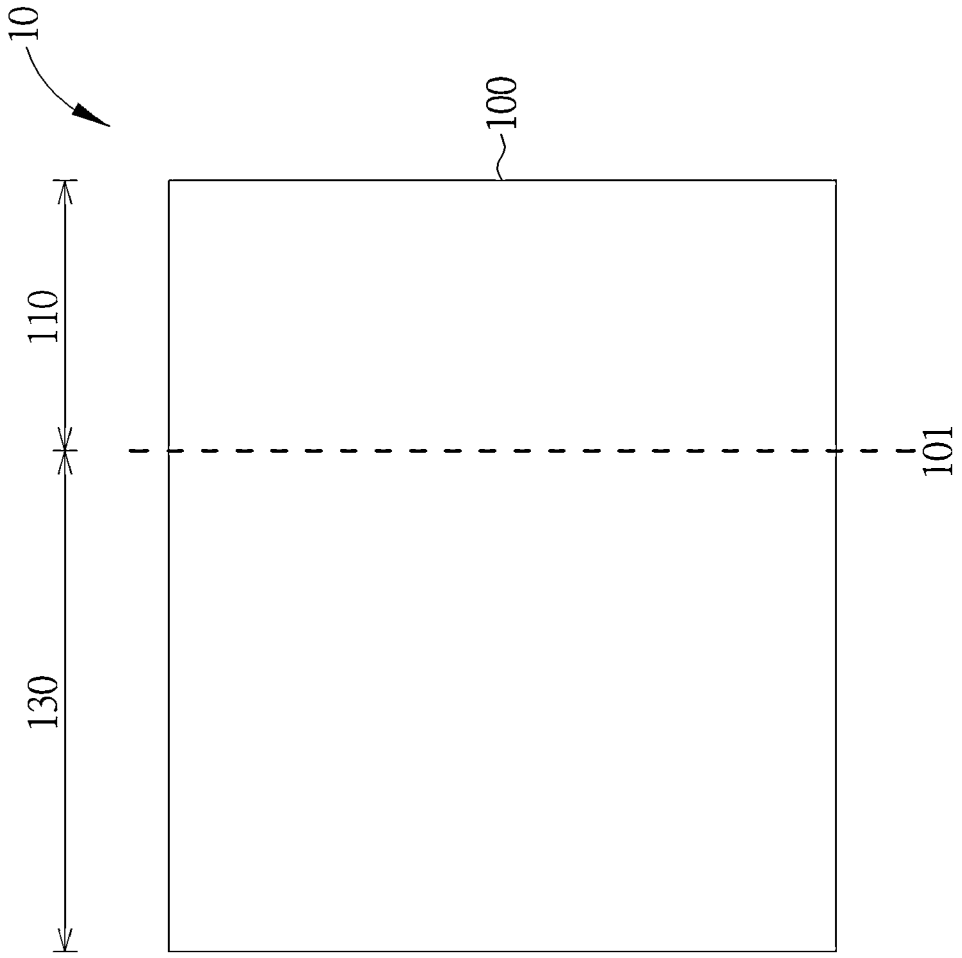

The electronic devices of the present disclosure will be described in detail with reference to the embodiments and the drawings. It is noted that, for purposes of illustrative clarity and being easily understood by the readers, the following drawings may be simplified schematic diagrams to show a part of the electronic devices, and components therein may not be drawn to scale. In addition, the numbers and dimensions of the components in the drawings are just illustrative, and are not intended to limit the scope of the present disclosure.

Certain terms are used throughout the specification and the appended claims of the present disclosure to refer to specific components. Those skilled in the art should understand that electronic device manufacturers may refer to a component by different names. This article does not intend to distinguish those components with the same function but different names. In the following description and claims, the words “containing” and “including” are open-ended words, so they should be interpreted as meaning “containing but not limited to . . . ”.

In addition, it should be understood that the spatially relative terms mentioned in the following embodiments, such as up, down, left, right, front, back, etc., are only referring to the directions of the drawings. The spatially relative terms are used to illustrate and not to limit the present disclosure. It should be understood that the components described or illustrated in the following embodiments may exist in various forms which are known to those skilled in the art. In addition, when a layer (or component) is "on" another layer (or component) or a substrate, it may mean that it is "directly" on another layer (or component) or a substrate, or that a layer (or component) is above another layer (or component) or a substrate, or that other layers (or components) are sandwiched between the layers (or components) or between the layer and the substrate.

Here, the terms "about", "approximately", "substantially", etc. usually mean within 20% of a given value or range, for example within 10%, 5%, 3%, 2%, 1%, or 0.5%. The quantity given here is an approximate quantity, that is, without specifying "about", "approximately", or "substantially", the given quantity may still imply the meaning of "about", "approximately" or "substantially".

In addition, it should be understood that although the terms "first", "second", "third", etc. may be used herein to describe various components, these components should not be limited by these terms. These terms may be only used to distinguish different components, and are not related to the manufacturing sequence of these components. The terms may not be used in the present embodiments and the claims by the same way. The components in the claims may be described by the terms "first", "second", "third", etc. according to the order of the components presented in the claims. Thus, a first component discussed below could be termed a second component in the claims.

It should be understood that according to the following embodiments, features of different embodiments may be replaced, recombined or mixed to constitute other embodiments without departing from the spirit of the present disclosure.

The stiffness (also referred to as k) mentioned in the present disclosure may refer to the ability (k=P/d) of a material structure to bear a stress and deform due to the stress. The unit (N/m) of stiffness may be force of newton per unit length of meter. That is to say, when multiple different structures are pressed under the same vertical stress, the displacement changes of the different structures in a vertical direction (not shown in the drawings) may be used to determine the stiffnesses of the different structures, but not limited thereto. For example, when the displacement change of one of the different structures in the vertical direction is large, it means that its stiffness is smaller; on the contrary, when the displacement change of one of the different structures in the vertical direction is small, it may indicate that its stiffness is greater, and so on. In the following embodiments, the stiffness measurement of different structures may be but not limited to be performed by the following methods. Firstly, when different structures to be tested have a sufficient area, a rectangular part of the same area may be taken or cut off from the center of the structures to be tested for stiffness measurement. The area may be 1 cm by 1 cm (1 cm×1 cm) or 2 cm by 2 cm (2 cm×2 cm), but not limited thereto. In some embodiments, the structures to be tested may have an opening, and the obtained rectangular part of the structures to be tested may simultaneously have an opening and an entity unit. In one embodiment, when measuring the stiffness, two opposite sides of the rectangular part may be supported by at least two fulcrums, or four corners of the rectangular part may be supported respectively by four fulcrums to fix the rectangular part, but not limited thereto. Afterwards, the vertical displacement change (d0) of the center point of the rectangular part may be measured firstly, and then a fixed force (P1) is pressed down at the center point of the rectangular part. After the force is applied, the displacement change (d1) of the center point of the rectangular part in the vertical direction is measured. Thereafter, the displacement changes of the center point of the rectangular part before and after the force is applied are compared to calculate the stiffness (k=P1/d1−d0) thereof. The displacement change (d0) may be the displacement of the rectangular part due to its own weight, but not limited thereto. The aforementioned displacement changes may be measured by an altimeter, thickness gauge, universal testing machine or other instruments suitable for measuring the displacement change, and the aforementioned fixed force may be measured by applying a weight or simulating the force by other suitable methods, and the weight may be measured by a scale or a suitable weight measuring machine, but not limited thereto.

In some embodiments, the different structures to be tested may have different materials, different thicknesses, different opening or groove patterning designs, different laminated structures, or combinations thereof, but not limited thereto.

In another embodiment, when different structures to be tested do not have a sufficient area and cannot obtain parts with the same area, the center point of each structure to be tested may be firstly taken after fixing the structures to be tested. Then, the distance from the center point to both sides of each structure to be tested is measured to define as a moment (L), and the vertical displacement change (d0) of the center point of the structure to be tested is measured at the same time. Subsequently, a fixed force (P2) is applied to press down the center point of the structures, and the displacement change (d2) of the center point of the structures to be tested in the vertical direction is measured after the force is applied. Finally, the displacement changes of the center point of the structures to be tested before and after the force is applied are compared to calculate the stiffness (k=P2*L/d2−d0) thereof. It should be noted that in the aforementioned stiffness measurement methods, although a fixed force (including P1 or P2) is used to press different structures to be tested, the actual measurement is not limited thereto. For example, when the difference in stiffness between the structures to be tested is too large, different applied forces may be used to press down different structures to be tested, and then the applied force is divided by the displacement change of the tested structure before and after the force is applied to calculate the stiffness. In addition, when the areas of the structures to be tested are the same, it may not to take the parts, and to directly measure the stiffness of the whole piece of the structures to be tested, but not limited thereto. Suitable measurement methods may be selected according to different product styles. It should be noted that when measuring different structures to be tested, the measurement may be performed under the same measurement conditions and procedures.

Please refer to FIGS. 1 to 6, which are schematic diagrams of an electronic device according to a first embodiment of the present disclosure. The electronic device is, for example, a display device 10, which includes a display panel 100, such as a rollable display panel as shown in FIG. 1, but not limited thereto. The display panel 100 may include one display panel or more than one display panels, for example, two or three display panels. The display panel 100 may include a rollable portion 110 and a non-rollable portion 130.

The rollable portion 110 may include the characteristics of being rolled or stretched through changing the shape, which includes rolling, folding, bending, bowing, or warping, etc., but not limited thereto. The non-rollable portion 130 may not have the characteristic of changing the shape. In other words, under the requirements of the users, the non-rollable portion 130 may have a substantially planar structure in any state of use, and may not have the characteristic of changing the shape. The rollable portion 110 may be coplanar with the planar structure of at least a part of the non-rollable portion 130 in different states of use, or may not be coplanar with the planar structure of at least a part of the non-rollable portion 130 and have the characteristic of changing the shape. It should be noted that the boundary 101 between the rollable portion 110 and the non-rollable portion 130 may be defined when the electronic device initially displays images, for example, while the rollable portion 110 is in the folding mode (as shown in the folding mode I of FIG. 2, or the folding mode III of FIG. 3), the region of the display panel 100 where the image is currently displayed when the electronic device starts to display images may be defined as the non-rollable portion 130, and the region of the display panel 100 that has an image display function but does not have an image to be displayed currently when the electronic device starts to display images may be defined as the rollable portion 110. In an embodiment, the non-rollable portion 130 may be a main display portion on the display panel 100, and the rollable portion 110 may be an extended display portion on the display panel 100, but not limited thereto. The rollable portion 110 may not display an image in the folding mode, but display any image in an unfolding mode, but not limited thereto. In other embodiments, at least a part of the rollable portion 110 may also display an image in the folding mold. Therefore, the user may stretch the rollable portion 110 when needed to assist the display function of the electronic device according to the usage requirements. In this way, the frequency of the rollable portion 110 being stretched may be reduced, and the service life of the electronic device may be increased.

Figure 2:
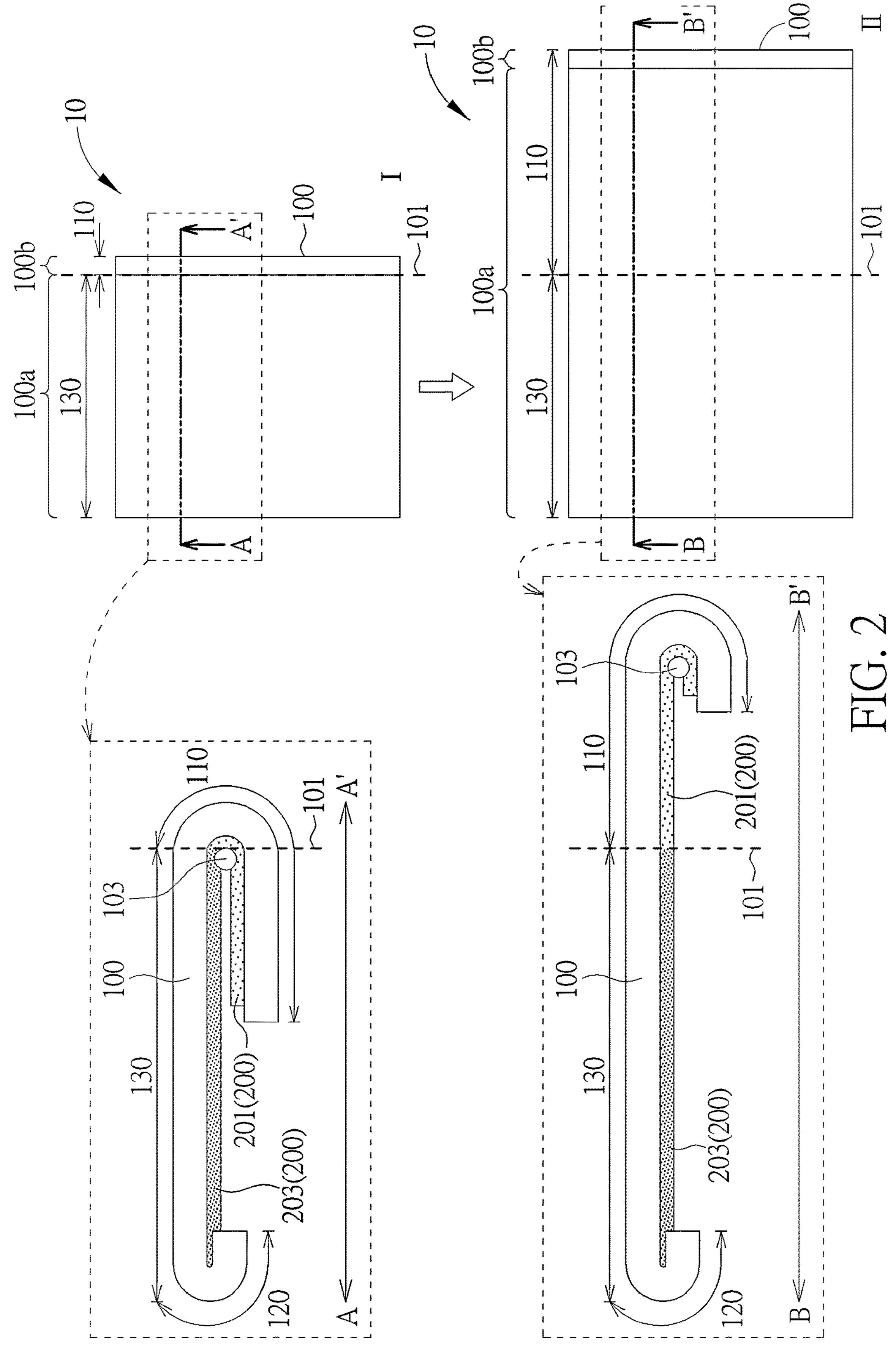

As shown in FIG. 2, a schematic diagram of the rollable portion 110 of the display panel 100 from the folding mold I to the unfolding mold II is illustrated, where the left side of FIG. 2 shows enlarged schematic diagrams along the section line A-A' and the section line B-B'. In an embodiment, when the rollable portion 110 is in the folding mold I, the active region 100*a* of the display panel 100 substantially includes the non-rollable portion 130. Meanwhile, a part of the rollable portion 110 may be rolled on the back side of the display panel 100 (that is, the side opposite to the side of the active region 100*a*) through a roller 103, but not limited thereto. In the present embodiment, the rollable portion 110 may be rolled in a single-circle around the roller 103, but not limited thereto. Those skilled in the art should understand that the rolling methods of the rollable portion 110 may also be adjusted according to actual requirements. For example, continuous multi-circles around the roller 103 may also be used for rolling (not shown in the drawings). In addition, another part of the rollable portion 110 that is not rolled on the back side may be located on the side of the active region 100*a*, and the another part may not display an image to serve as a non-active region 100*b*, but not limited thereto. In the folding mold I, the boundary 101 between the rollable portion 110 and the non-rollable portion 130 may be the boundary between the active region 100*a* and the non-active region 100*b* of the display panel 100.

On the other hand, when the rollable portion 110 is in the unfolding mold II, the portion rolled on the back side may be at least partially stretched on the side of the active region 100*a* through the roller 103. Meanwhile, the non-rollable portion 130 and at least a part of the rollable portion 110 may be coplanar, so that the active region 100*a* of the display panel 100 may further include the non-rollable portion 130 and the at least a part of the rollable portion 110, thereby having a relatively large display range. However, there is still another part of the rollable portion 110 that may not display an image, or may be still rolled on the back side through the roller 103 to be the non-active region 100*b*. In other words, in the unfolding mold II, the boundary 101 between the rollable portion 110 and the non-rollable portion 130 may be located within the active region 100*a* of the display panel 100, and may not be equal to the boundary between the active region 100*a* and the non-active region 100*b*.

Figure 3:
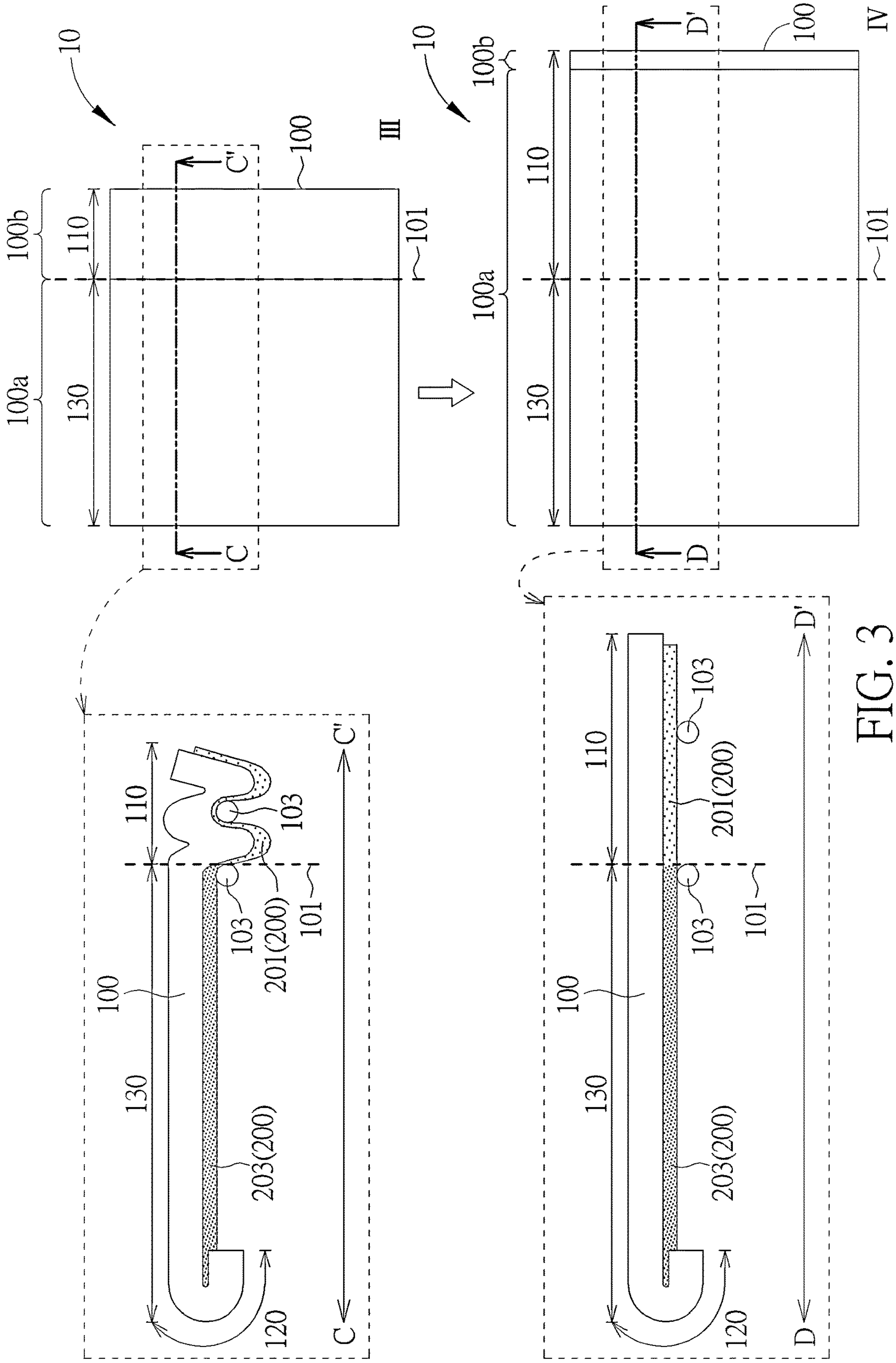

As shown in FIG. 3, a schematic diagram of the rollable portion 110 of the display panel 100 from a folding mold III to a unfolding mold IV is illustrated, where the left side of FIG. 3 shows enlarged schematic diagrams along the section line C-C' and the section line D-D'. When the rollable portion 110 is in the folding mold III, the active region 100*a* of the display panel 100 includes the non-rollable portion 130. Meanwhile, the rollable portion 110 may be rolled through more than one roller 103, and the rollable portion 110 in the folding mold III may not display images to be a non-active region 100*b*. In the present embodiment, the rollable portion 110 is rolled through the rollers 103 in a manner similar to fold a fan or curtains, but not limited thereto. Those skilled in the art should understand that the number of the aforementioned rollers 103 may be two as shown in FIG. 3, or other numbers, and the rollers 103 may have other suitable configurations according to actual requirements to assist the rolling of the rollable portion 110. In this case, the boundary 101 between the rollable portion 110 and the non-rollable portion 130 may also be the boundary between the active region 100*a* and the non-active region 100*b* of the display panel 100.

When the rollable portion 110 is in the unfolding mold IV, the rollable portion 110 may be stretched on the side of the active region 100*a* through the rollers 103. Meanwhile, the non-rollable portion 130 and a part of the rollable portion 110 may be coplanar, so that the active region 100*a* of the display panel 100 may further include the non-rollable portion 130 and the rollable portion 110, and may also have a relatively large display range. In this way, in the unfolding mold IV, the boundary 101 between the rollable portion 110 and the non-rollable portion 130 may also be located within the active region 100*a* of the display panel 100, and may not be equal to the boundary between the active region 100*a* and the non-active region 100*b*. However, in one embodiment, there is still a part of the rollable portion 110 that may not display images, for example the part located at the edge of the rollable portion 110 is the non-active region 100*b*.

It should also be noted that the electronic device further includes a support structure 200 that may be disposed on the back side (for example, the non-display side) of the display panel 100 to improve the stiffness of the display panel 100. In an embodiment, the material of the support structure 200 may include, but not limited to, stainless steel, copper, aluminum, alloy, composite metal, or other suitable metal materials, or a combination thereof, so that the support structure 200 is not easily damaged, or is not prone to permanent deformation or crease, or it may further have the function of heat dissipation or electromagnetic shielding, but not limited thereto. In an embodiment, the support structure 200 may be a single-layered structure or a multiple-layered structure. In the multiple-layered structure, each layer may include the aforementioned materials, but not limited thereto. Those skilled in the art should understand that the support structure 200 may have different thickness ranges according to actual product requirements or material selection, for example, about 50 micrometers (μm) to 500 μm (50 μm≤thickness≤500 μm), such as being 100 μm, 200 μm, or 300 μm, but not limited thereto. The support structure 200 may include a first area 201 and a second area 203 with different stiffnesses. For example, the support structure 200 may include a piece of support structure, and the first area 201 and the second area 203 may be portions of the piece of support structure, respectively. Alternatively, the support structure 200 may include more than one pieces of support structure, and the first area 201 and the second area 203 may be two pieces of support structure separated from each other, respectively corresponding to different portions of the display panel 100. The first area 201 with a relatively lower stiffness may be optionally correspond to the rollable portion 110, so as to provide the required flexibility when the rollable portion 110 is in the folding mold I or the folding mold III, and to provide the required support when the rollable portion 110 is in the unfolding mold II or the unfolding mold IV. The second area 203 with a relatively higher stiffness may be optionally correspond to the non-rollable portion 130 to provide sufficient mechanical strength or support, but not limited thereto. The support structure 200 may provide stiffness requirements for different portions of the display panel 100 (including the rollable portion 110 and the non-rollable portion 130), so that the rollable portion 110 of the display panel 100 may withstand multiple folding and un-folding, thereby reducing the possibility of permanent deformation. In addition, the display panel 100 of the embodiment may include other portions in addition to the aforementioned rollable portion 110 and the non-rollable portion 130. For example, the rollable portion 110 may be disposed on one side of the non-rollable portion 130, and a peripheral region 120 may be further disposed on the other side of the non-rollable portion 130. For example, the peripheral region 120 may be fixed or bent to the back side of the display panel 100 without the characteristics of changing the shape, as shown in FIG. 2 and FIG. 3, that is, when the user uses the electronic device or the display device 10, the peripheral region 120 may be kept fixed and not deformed.

Figure 4:
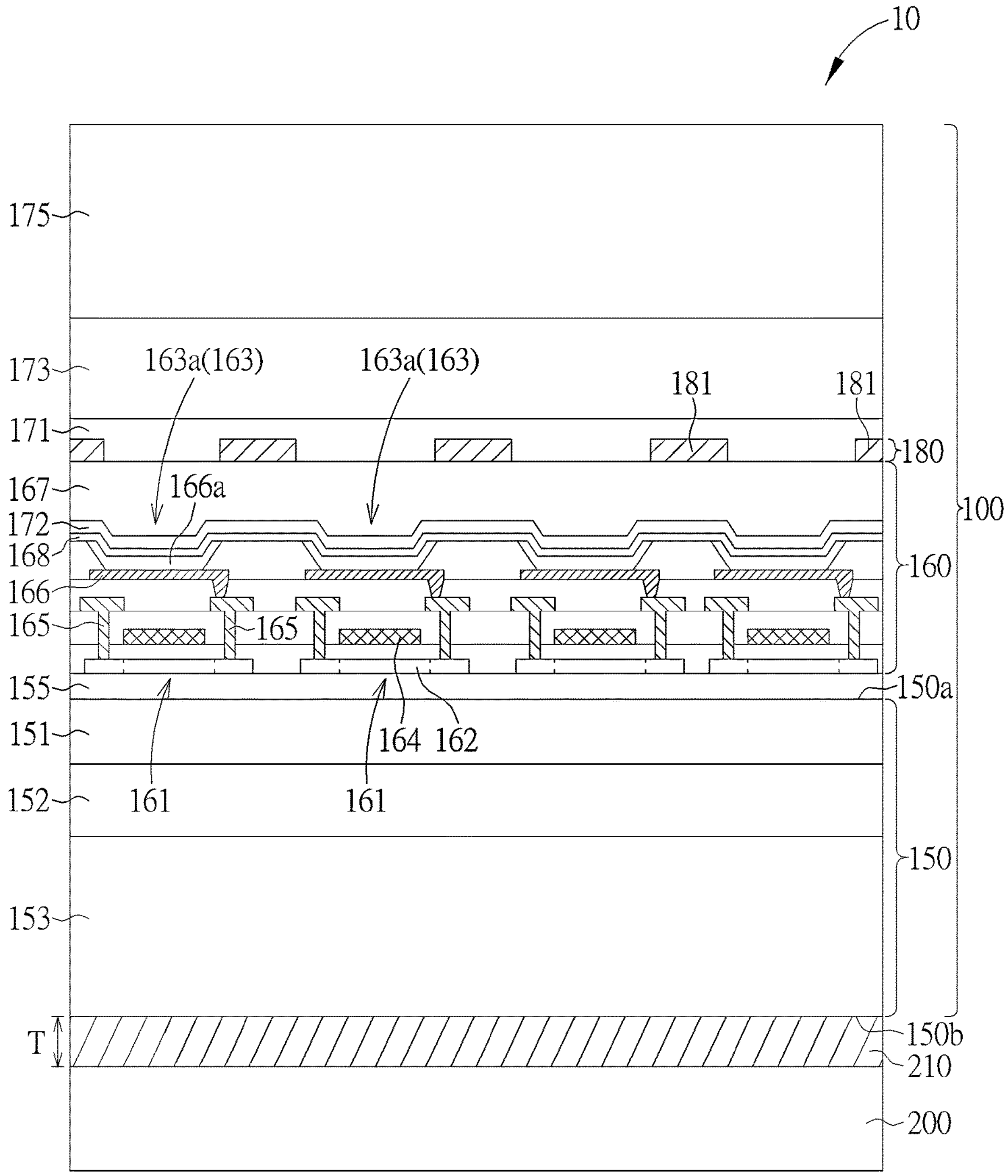
Figure 5:
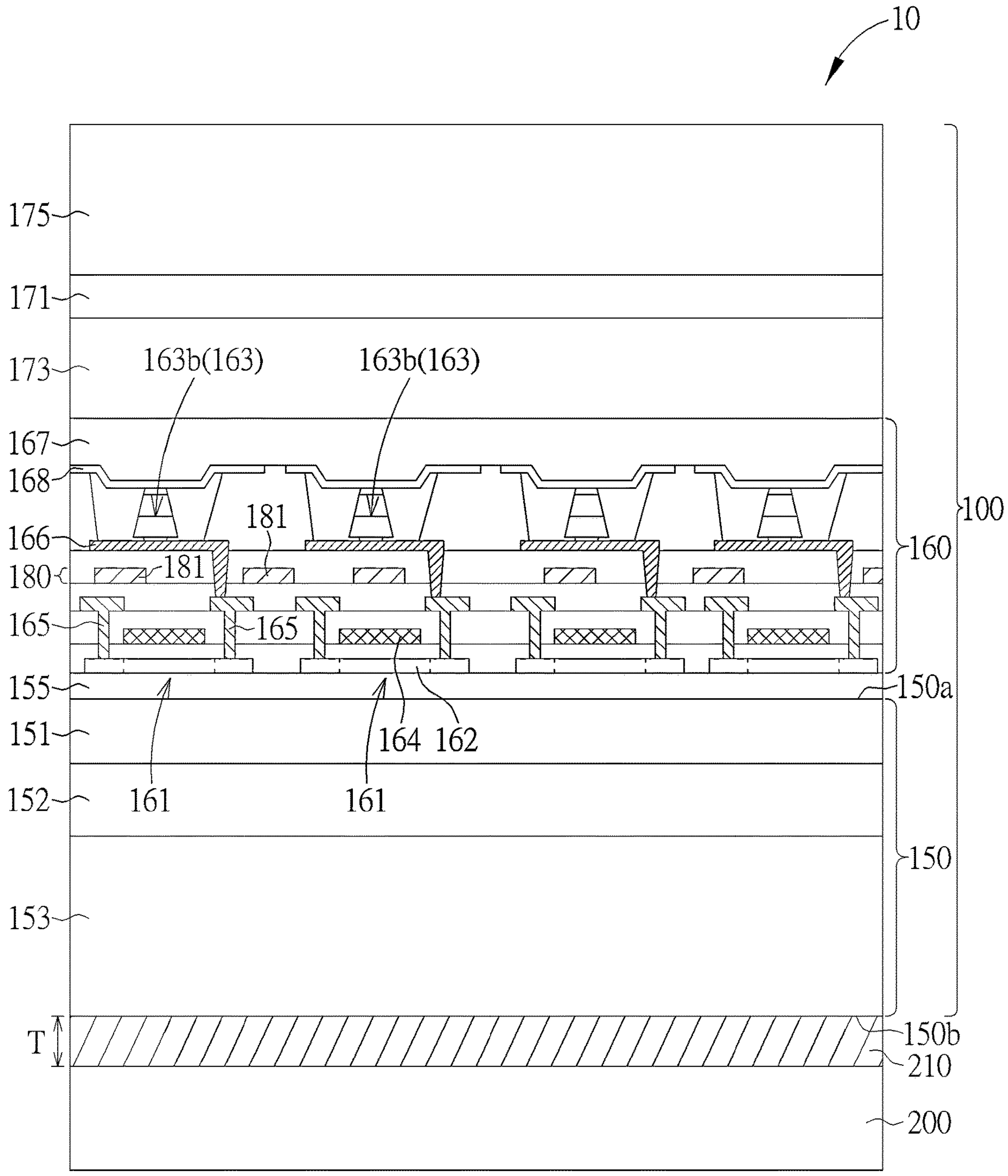

As shown in FIG. 4 and FIG. 5, the detailed structures of a part of the display panel 100 are illustrated. The display panel 100 may include a substrate 150 and a display layer 160 disposed on a surface 150*a* of the substrate 150. The support structure 200 is disposed on another surface 150*b* of the substrate 150. The substrate 150 may optionally include a bendable substrate 151 and a supporting film 153, and the bendable substrate 151 may be adhered to the supporting film 153 through a supporting film glue 152. The material of the bendable substrate 151 may include, for example, glass, polyimide (PI), polycarbonate (PC), or polyethylene terephthalate (PET), other suitable materials or a combination thereof, but not limited thereto. The material of the supporting film 153 may include, for example, polyimide or polyethylene terephthalate, other suitable materials, or a combination thereof, but not limited thereto. In some embodiments, the bendable substrate 151 may be a single-layered or multi-layered structure. For example, the bendable substrate 151 may be a multi-layered structure including a stack of polyimide, an inorganic insulating layer and polyimide.

In the present embodiment, a buffer layer 155 may be further disposed between the substrate 150 and the display layer 160. The display layer 160 may be disposed on the buffer layer 155, but not limited thereto. In another embodiment, the buffer layer 155 may be omitted, and the display layer 160 may be directly disposed on the bendable substrate 151 of the substrate 150. The display layer 160 may include a plurality of active components 161 and a plurality of light emitting components 163. The active components 161 may include thin film transistors (TFTs) or other suitable active components. The active component 161 may include source/drain electrodes 165, a gate electrode 164 and a semiconductor layer 162. The gate electrode 164 may be disposed on the semiconductor layer 162. The light emitting component 163 may include a first electrode 166, a display medium layer 166*a*, and at least a part of a second electrode 168. The first electrode 166 and the second electrode 168 may be the cathode and the anode of the light emitting component 163. Each active component 161 may correspond to each light-emitting component 163 respectively, and is electrically connected to the light-emitting component 163 through the first electrode 166 to control display-related functions. The light-emitting component 163 may be further covered with an insulating layer 172 and an encapsulation layer 167 to reduce the possibility of the parts of each light-emitting component 163 exposed to moisture or oxygen. The insulating layer 172 may include organic materials. In addition, in some embodiments, the encapsulation layer 167 may be a multi-layered structure. For example, the encapsulation layer 167 may be a stack of a first inorganic insulating layer, an organic insulating layer, and a second inorganic insulating layer from bottom to top. The first inorganic insulating layer is disposed closer to the light-emitting component 163 than the second inorganic insulating layer, and the thickness of the first inorganic insulating layer may be greater than the thickness of the second inorganic insulating layer, which may reduce moisture or oxygen contacting the light-emitting component 163. In the present embodiment, the light-emitting component 163 may optionally include an organic light emitting diode (OLED) 163*a* as shown in FIG. 4, a micro-light-emitting diode (micro-LED) 163*b* as shown in FIG. 5, a sub-millimeter LED (mini LED), or quantum dot OLED/quantum dot LED (QD-OLED/QLED), but not limited thereto. The support structure 200 may be adhered to the substrate 150 through a supporting structure glue 210. In one embodiment, the thickness T of the supporting structure glue 210 is, for example, about 50 μm to 200 μm (50 μm≤thickness T≤200 μm), such as 100 μm, 150 μm, etc., but not limited thereto. Those skilled in the art should understand that the thickness T of the supporting structure glue 210 may also be selected in other ranges according to actual product requirements.

In an embodiment, the display panel 100 may further include a polarizer 173 and a cover plate 175. The polarizer 173 and the cover plate 175 may be disposed above the display layer 160 through an adhesive layer 171. The adhesive layer 171 may include solid or liquid optical clear adhesive (OCA) or other materials suitable for adhesion, and may be used to adhere the cover plate 175 or the polarizer 173. For example, in one embodiment, the adhesive layer 171 may be optionally disposed between the polarizer 173 and the encapsulation layer 167, or between the cover plate 175 and the encapsulation layer 167, as shown in FIG. 4. In another embodiment, the adhesive layer 171 may be optionally disposed between the cover plate 175 and the polarizer 173, as shown in FIG. 5. In addition, the display panel 100 may further include a touch layer 180. The touch layer 180 may include a plurality of touch sensing components 181, wherein the touch sensing components 181 may be optionally disposed above the display layer 160, and directly covered by the adhesive layer 171 as shown in FIG. 4, or the touch sensing components 181 may be optionally integrated in the display layer 160, for example, disposed between the active component 161 and the light-emitting component 163, as shown in FIG. 5, but not limited to the aforementioned configurations. For example, in other embodiments, the adhesive layer 171, the polarizer 173 and/or the cover plate 175 may not be disposed.

Figure 6:
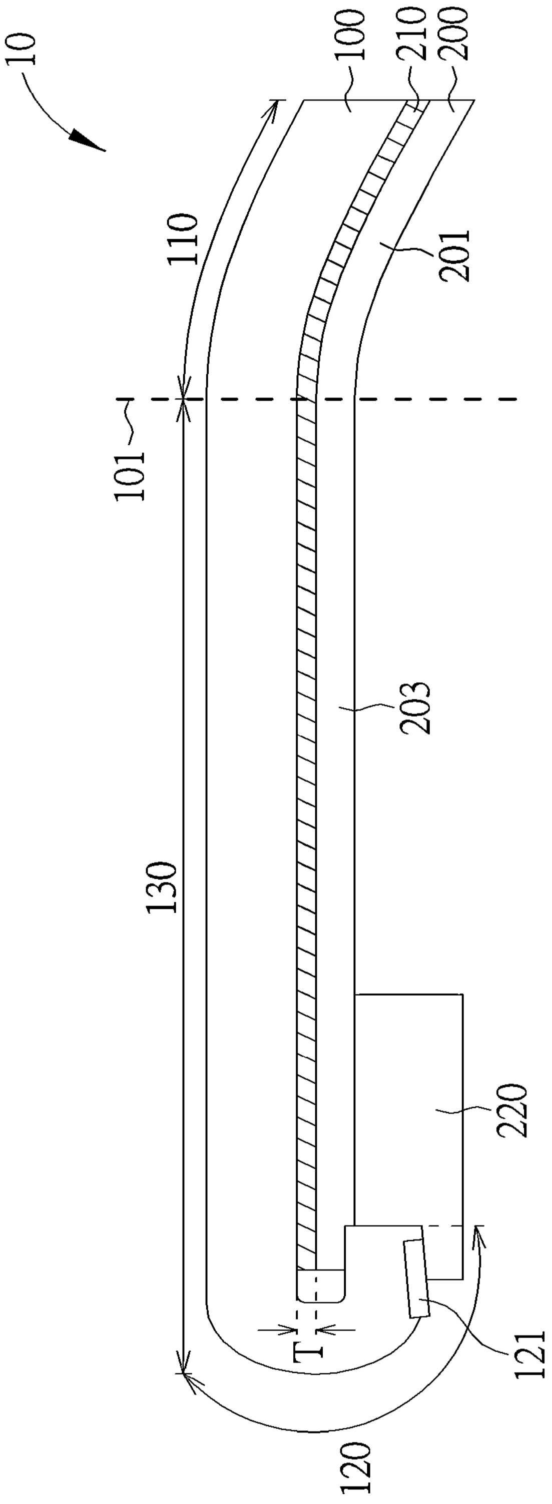

It should be noted that, as shown in FIG. 6, in the present embodiment, the support structure 200 may be substantially fully adhered to the surface 150*b* of the substrate 150 through the supporting structure glue 210, so that the supporting structure glue 210 may cover substantially all the surface of the support structure 200. Therefore, the displacement or cracking of the supporting structure glue 210 caused by the displacements of the components during pulling, rolling, folding, bending, warping, or bowing of the display panel 100 is reduced, and the possibility of a separation between the support structure 200 and the substrate 150 is also reduced. In the present embodiment, the boundary between the first area 201 and the second area 203 of the support structure 200 may substantially overlap the boundary 101 between the rollable portion 110 and the non-rollable portion 130 of the display panel 100, and the stiffness of the first area 201 may be less than the stiffness of the second area 203, that is, the stiffness of the area of the support structure 200 corresponding to the rollable portion 110 may be less than the stiffness of the area of the support structure 200 corresponding to the non-rollable portion 130. In this way, the stiffness Sb of the rollable portion 110 of the display panel 100 may be correspondingly less than the stiffness Sa of the non-rollable portion 130. As shown in FIG. 6, if the rollable portion 110 is not supported by an additional housing (not shown), the rollable portion 110 may sag naturally. For example, the ratio of the stiffness Sa of the non-rollable portion 130 and the stiffness Sb of the rollable portion 110 may be between 1.5 and 15 ($1.5 \leq Sa/Sb \leq 15$), such as 5, 7 or 10, but not limited thereto. If the ratio of the stiffness Sa of the non-rollable portion 130 and the stiffness Sb of the rollable portion 110 is, for example, greater than 15, the stiffness Sb of the rollable portion 110 is too low, which may increase the possibility of insufficient support for the rollable portion 110; if the ratio of the stiffness Sa of the non-rollable portion 130 and the stiffness Sb of the rollable portion 110 is, for example, less than 1.5, the stiffness Sb of the rollable portion 110 is too high, which may increase the possibility of that the rollable portion 110 is not easy to roll, fold, bend, warp, or bow. However, in another embodiment, the boundary of the areas of the support structure 200 with different stiffnesses (such as the first area 201 and the second area 203) may also be selected to not completely correspond to the boundary 101 between the rollable portion 110 and the non-rollable portion 130 of the display panel 100. The stiffnesses of the support structure 200 may be gradually decreased from the area of the support structure 200 corresponding to the non-rollable portion 130 to the area of the support structure 200 corresponding to the rollable portion 110, but not limited thereto. In addition, in an embodiment, the display panel 100 may further include a circuit portion 220 that may be disposed on a portion of the display panel 100 with sufficient stiffness or support, such as the non-rollable portion 130, which is beneficial on assembly or to improve the fixed effect of the components. In the present embodiment, the circuit portion 220 may be disposed on the back side of the non-rollable portion 130. In this way, when the circuit portion 220 is attached to the display panel 100, the possibility of that the circuit portion 220 affects the flatness of the display panel 100 may be reduced. The circuit portion 220 may be electrically connected to the display layer 160 and/or the touch layer 180 of the display panel 100 through a bonding pad 121 on the peripheral region 120. The circuit portion 220 may be used as a signal processing portion, for example, including a flexible printed circuit board (FPCB) or a chip on film (COF) package board, but not limited thereto.

Under the aforementioned configurations, support structure 200 may satisfy the stiffness requirements of different portions of the display panel 100 (including the rollable portion 110 and the non-rollable portion 130), so that the display panel 100 may withstand multiple folding and un-folding, or reduce the possibility of permanent deformation. However, those skilled in the art should easily understand that the electronic devices of the present disclosure may also have other configurations under the premise of satisfying actual requirements of products. For example, in the aforementioned embodiments, although the support structure 200 is additionally disposed under the supporting film 153 of the substrate 150, in another embodiment, the supporting film 153 and the supporting film glue 152 may be omitted, and the supporting structure glue 210 and the support structure 200 in sequence are directly disposed under the bendable substrate 151 of the substrate 150 to replace the supporting film 153 and the supporting film glue 152. Alternatively, in another embodiment, another peripheral region (not shown in the drawings) may be disposed on the side of the rollable portion 110 away from the non-rollable portion 130, and the another peripheral region may not have the characteristic of changing the shape and may not have the image display function (being the non-active region). The another peripheral region may be used for the wiring arrangement of the electronic device, and the area of the support structure 200 corresponding to the another peripheral region may have a relatively high stiffness Sc, for example, approximately equal to the stiffness of the support structure 200 corresponding to the stiffness Sa of the non-rollable portion 130. For example, the ratio of the stiffness Sa to the stiffness Sc may be between 0.8 and 1.4 ($0.8 \leq Sa/Sc \leq 1.4$), such as 1.0 or 1.2, but not limited thereto.

The following will further describe other embodiments or variations of the electronic devices of the present disclosure. In order to simplify the description, the following description mainly focuses on the differences between the embodiments, and the similarities are not repeated. In addition, the same components in the present embodiments of the present disclosure are labeled with the same reference numerals to facilitate comparison between the embodiments.

Figure 7:
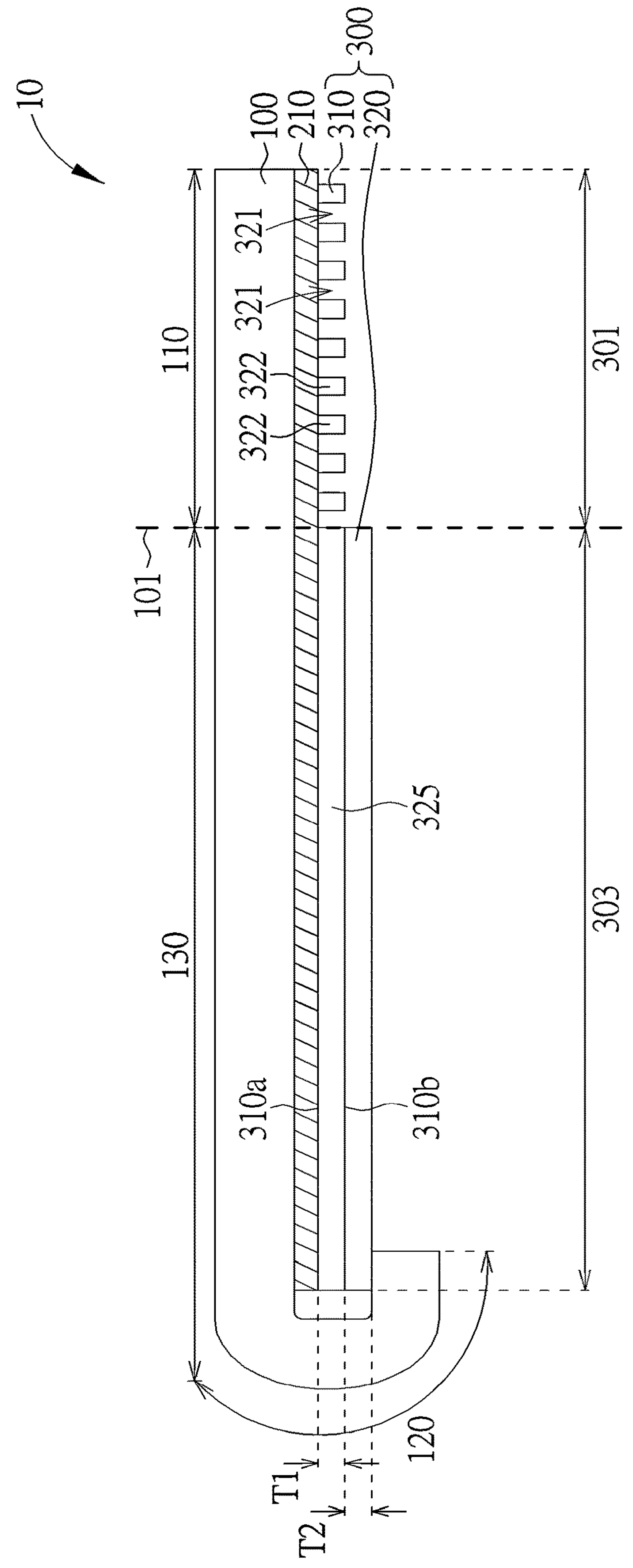
Figure 8:
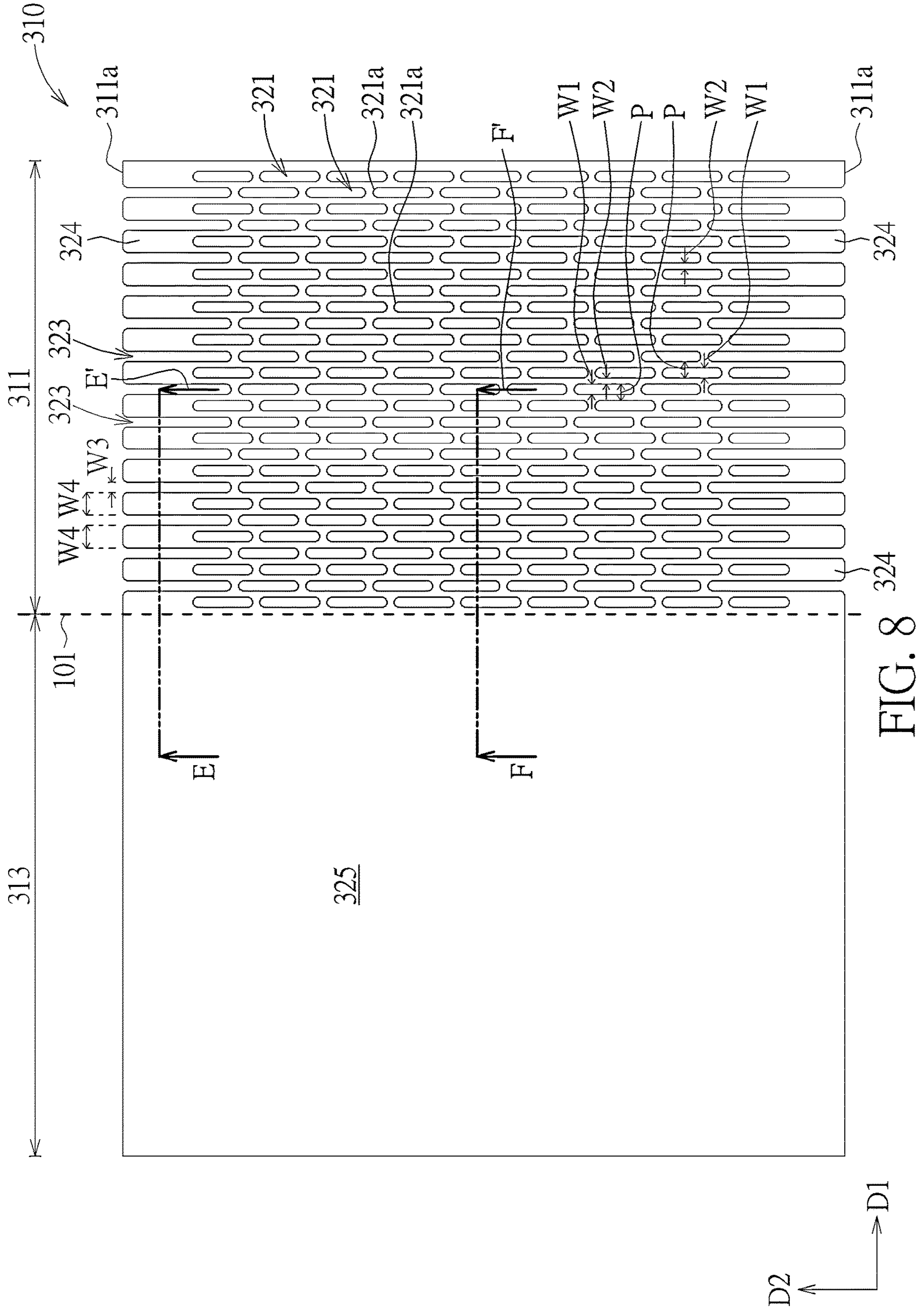
Figure 9:
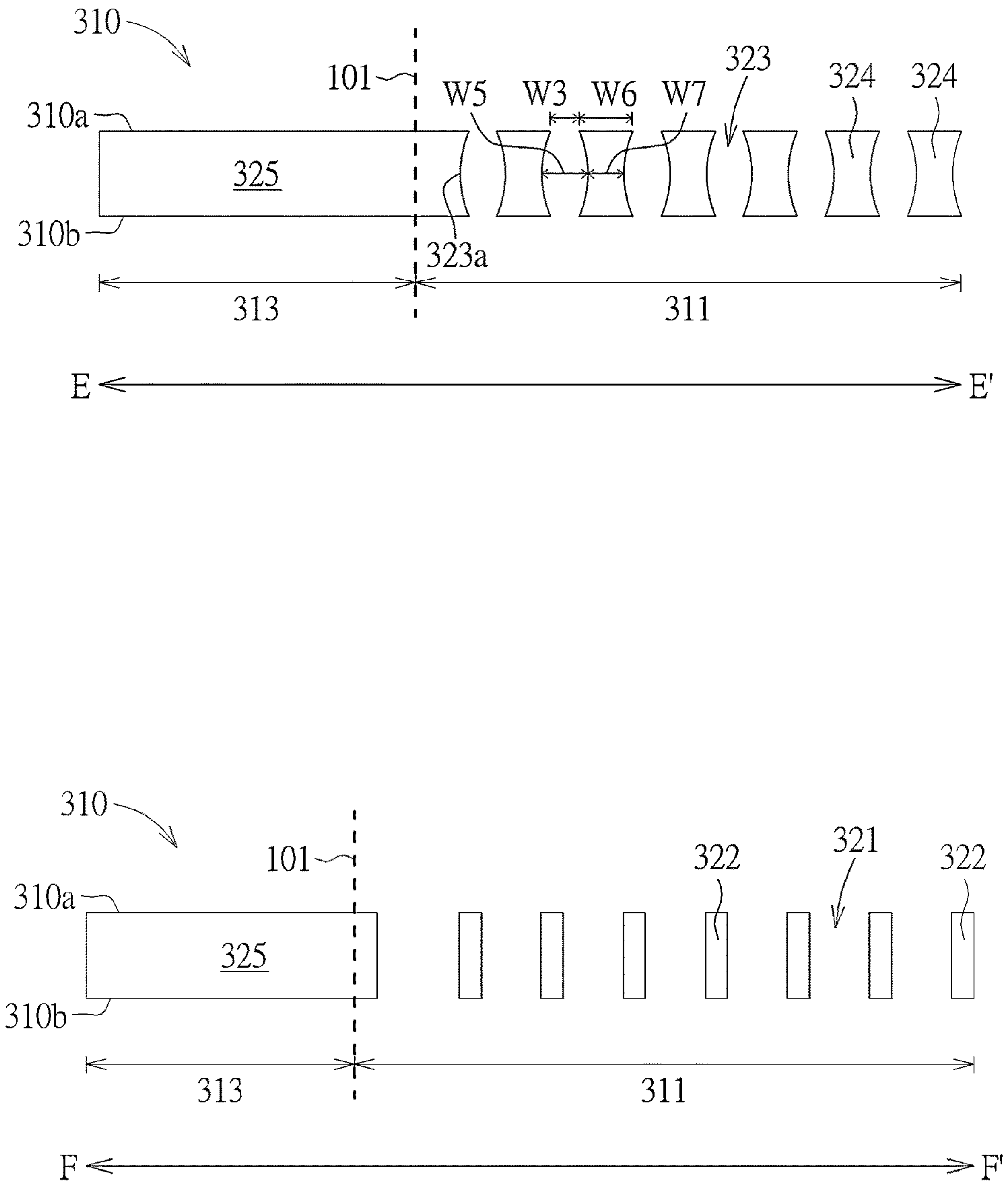

Please refer to FIGS. 7 to 9, which are schematic diagrams of an electronic device of a second embodiment of the present disclosure, wherein FIG. 7 shows a schematic cross-sectional view of the electronic device of the second embodiment, and FIG. 8 shows a schematic top view of a first support structure of the electronic device of the second embodiment, and FIG. 9 shows schematic partial enlarged cross-sectional views of the first support structure along the section line E-E' and the section line F-F' of FIG. 8. The electronic device is, for example, a display device 10, which may include a display panel 100 (rollable display panel), and the display panel 100 may also include a rollable portion 110 and a non-rollable portion 130, and the same parts as in the aforementioned embodiments are not repeated in details. A support structure 300 may be disposed on the backside of the display panel 100, and the support structure 300 may be adhered to the display panel 100 through the supporting structure glue 210 to improve the stiffness of the display panel 100. In the present embodiment, the support structure 300 may include a first area 301 and a second area 303 with different stiffnesses, corresponding to the rollable portion 110 and the non-rollable portion 130 of the display panel 100, respectively (as shown in FIG. 7). In addition, the boundary between the first area 301 and the second area 303 may substantially overlap the boundary 101 between the rollable portion 110 and the non-rollable portion 130 of the display panel 100, but not limited thereto. The difference in stiffness between the first area 301 and the second area 303 of the support structure 300 may be caused by the difference in the structures of the first area 301 and the second area 303.

As shown in FIG. 7, in detail, the support structure 300 may include a first support structure 310 and a second support structure 320. The surface 310*a* of the first support structure 310 may directly contact the supporting structure glue 210, and the second support structure 320 is disposed on another surface 310*b* of the first support structure 310. The first support structure 310 corresponds to both the rollable portion 110 and the non-rollable portion 130 of the display panel 100, and the second support structure 320 corresponds to the non-rollable portion 130 of the display panel 100. In an embodiment, the materials of the first support structure 310 and/or the second support structure 320 may include stainless steel, copper, aluminum, alloy, composite metal, or other suitable metal materials, but not limited thereto. In addition, the maximum thickness T1 of the first support structure 310 and/or the maximum thickness T2 of the second support structure 320 may be about 50 μm to 500 μm (50 μm≤thickness T1 and/or thickness T2≤500 μm), for example, 100 μm, 200 μm, 300 μm, etc., but not limited thereto. Those skilled in the art should understand that according to the stiffness requirements of the actual products, the material of the first support structure 310 may be the same as or different from the material of the second support structure 320, and the maximum thickness T1 of the first support structure 310 may also be the same as or different from the maximum thickness T2 of the second support structure 320, and the maximum thickness T1 of the first support structure 310 and/or the maximum thickness T2 of the second support structure 320 may also have other applicable ranges in accordance with the difference materials or used in different electronic products. For example, if the material of the first support structure 310 includes steel or stainless steel, the maximum thickness T1 of the first support structure 310 is, for example, about 100 μm to 200 μm (100 μm≤thickness T1≤200 μm), such as 130 μm, 160 μm, 190 μm, etc., but not limited thereto. The range of the aforementioned maximum thickness T1 may be applied to electronic devices ranging from 5 inches to 10 inches, such as tablet computers or mobile phones, but not limited thereto. When the first support structure 310 is applied to other large-sized electronic devices, it may have other thickness ranges.

Please refer to FIG. 8 and FIG. 9, it should be noted that the first support structure 310 includes a plurality of first openings 321 and a plurality of second openings 323 in the first area 311 corresponding to the rollable portion 110. The first support structure 310 further includes an entity unit 325 in the second area 313 corresponding to the non-rollable portion 130. The placement of the first openings 321 and/or the second openings 323 may cause the difference in stiffness between the first area 311 and the second area 313 of the first support structure 310. In the present embodiment, the second openings 323 may be, for example, disposed on the edges of the first area 311, such as located at two sides 311*a* of the first area 311 that are substantially parallel to the stretching direction D1 of the display panel 100. In detail, the first openings 321 may be elongated and extend along a direction D2 that is substantially perpendicular to the stretching direction D1. In the stretching direction D1, at least a part of the first openings 321 and the first openings 321 adjacent thereto on two sides thereof are arranged in a mutually misalignment manner, thereby present a grid-like structure as a whole, but not limited thereto. In an embodiment, at least a part of the first openings 321 may have an arc side edge 321*a* in the stretching direction D1, which may reduce the possibility of fracture at the edges of the first opening 321. In one embodiment, the formation of the first openings 321 and the second openings 323 is performed by, for example, a laser cutting process, but not limited thereto. In addition, the edges of at least a part of the first openings 321 and/or the second openings 323 may have an arc-shaped edge, which may be used to disperse stress, to achieve the function of increasing the number of using the first support structure 310 or to reduce the possibility of breakage that is easily caused by the sharp or right-angled parts produced in the cutting process when the component is stretched.

In an embodiment, the first openings 321 have substantially the same width W1 in the stretching direction D1 and may be arranged in sequence according to the pitch P. The pitch P may be between 0.4 millimeters (mm) and 10 mm (0.4 mm≤pitch P≤10 mm), such as 1 mm, 5 mm, or 7 mm, but not limited thereto. The first openings 321 are spaced apart from each other by a plurality of spacers 322. The width W2 of the spacer 322 in the stretching direction D1 may be smaller than the width W1 of the first opening 321 (W1>W2), so as to effectively reduce the stiffness of the first area 311. Those skilled in the art should understand that the widths and/or the pitches of the first openings 321 in the stretching direction D1 may be different from each other according to the stiffness requirements of the actual products. On the other hand, the second opening 323 may extend to the two sides 311*a* of the first support structure 310 in the direction D2, and the two sides 311*a* may be cut into a plurality of segments 324, as shown in FIG. 8. In this way, the placement of the second openings 323 may reduce the stress concentrating on the two sides 311*a*, and reduce the possibility of problems such as breakage of the rollable portion 110 of the display panel 100. The width W4 of the segment 324 in the stretching direction D1 is, for example, about 1 mm to 8 mm (1 mm≤width W4≤8 mm), such as 2 mm, 4 mm, or 6 mm, but not limited thereto. In addition, since the sides 311*a* of the first area 311 are closer to the housing of the electronic device, it is easily damaged by friction or external force, so the width W4 of the segment 324 may be greater than the width W3 of the second opening 323 in the stretching direction D1 (W4>W3), which may reduce the possibility of the sides 311*a* being damaged by friction or external force, but not limited thereto.

It should be noted that, as shown in FIGS. 7 to 9, the second openings 323 may have a necking structure in the cross section along the section line E-E'. In other words, the aforementioned width W3 may be the diameter of each second opening 323 on the surface 310*a*, and the maximum width W5 of the second opening 323 may be located at approximately half of the maximum thickness T1 of the first support structure 310 (W5>W3), but not limited thereto. The second opening 323 may have a circular arc sidewall 323*a*, which effectively reduces the stiffness of the first support structure 310. The segment 324 may have a dumbbellshaped structure in the cross section (the upper and lower portions are wide and the middle portion is narrow), that is, the segment 324 may have the maximum width W6 on the surface 310*a*, and have a smaller width W7 located at half of the maximum thickness T1 of the first support structure 310 (W6>W7). The first opening 321 may have a different structure (different from the necking structure) in the cross section along the section line F-F', as shown in FIG. 9.

In summary, in the present embodiment, the placement of the first openings 321 and/or the second openings 323 may cause the difference in stiffness between the first area 311 and the second area 313 of the first support structure 310. The placement of the second openings 323 may be located close to the edges of the first area 311, and the edges of the first area 311 generally has a greater possibility of bearing friction or force. Therefore, the second openings 323 may extend to the sides 311*a* of the first area 311 and have a necking structure to improve the stress concentration and other problems. In addition, when the second openings 323 are arranged, the width W4 of the segment 324 between the second openings 323 in the stretching direction D1 may be relatively large (the width W4 is greater than the width W3 of the second opening 323), which may reduce the possibility of the edges of the first support structure 310 being damaged by friction or external forces. When the first openings 313 are arranged, the width W1 of the first opening 313 in the stretching direction D1 may be relatively large (the width W1 is greater than the width W2 of the spacer 322), which may effectively reduce the stiffness. Under the aforementioned configurations, different areas of the support structure 300 (including the first area 301 and the second area 303) may have different structures, wherein the first area 301 of the support structure 300 may include the first area 311 of the first support structure 310, and the second area 303 of the support structure 300 may include the second area 313 of the first support structure 310 and the second support structure 320. In addition, the first area 311 of the first support structure 310 further includes the first openings 321 and the second openings 323 to reduce the stiffness. In this way, the first area 301 of the support structure 300 may have a relatively small stiffness Sb, and the second area 303 may have a relatively large stiffness Sa. Therefore, different areas of the support structure 300 may provide different stiffnesses, and the configuration of the support structure 300 may satisfy the requirements in stiffness of different portions of the display panel 100 (including the rollable portion 110 and the non-rollable portion 130, as shown in FIG. 1). It enables the display panel 100 to withstand multiple folding and un-folding, thereby reducing the possibility of permanent deformation.

In the aforementioned second embodiment, the support structure 300 includes both the first support structure 310 and the second support structure 320. Therefore, the difference in stiffness between the first area 301 and the second area 303 of the support structure 300 is produced by the difference in the combined structures of the first support structure 310 and the second support structure 320. However, in accordance with the stiffness requirements of the actual products, in another embodiment, the second support structure 320 may be omitted, and the difference in stiffness of different areas of the support structure may be produced by the difference in the structures of the first area 311 (where the first opening 321 and the second opening 323 are disposed) and the second area 313 (where the entity unit 325 is disposed) of the first support structure 310, or through other structural differences to produce the difference in stiffness of different areas of the support structure.

Figure 10:
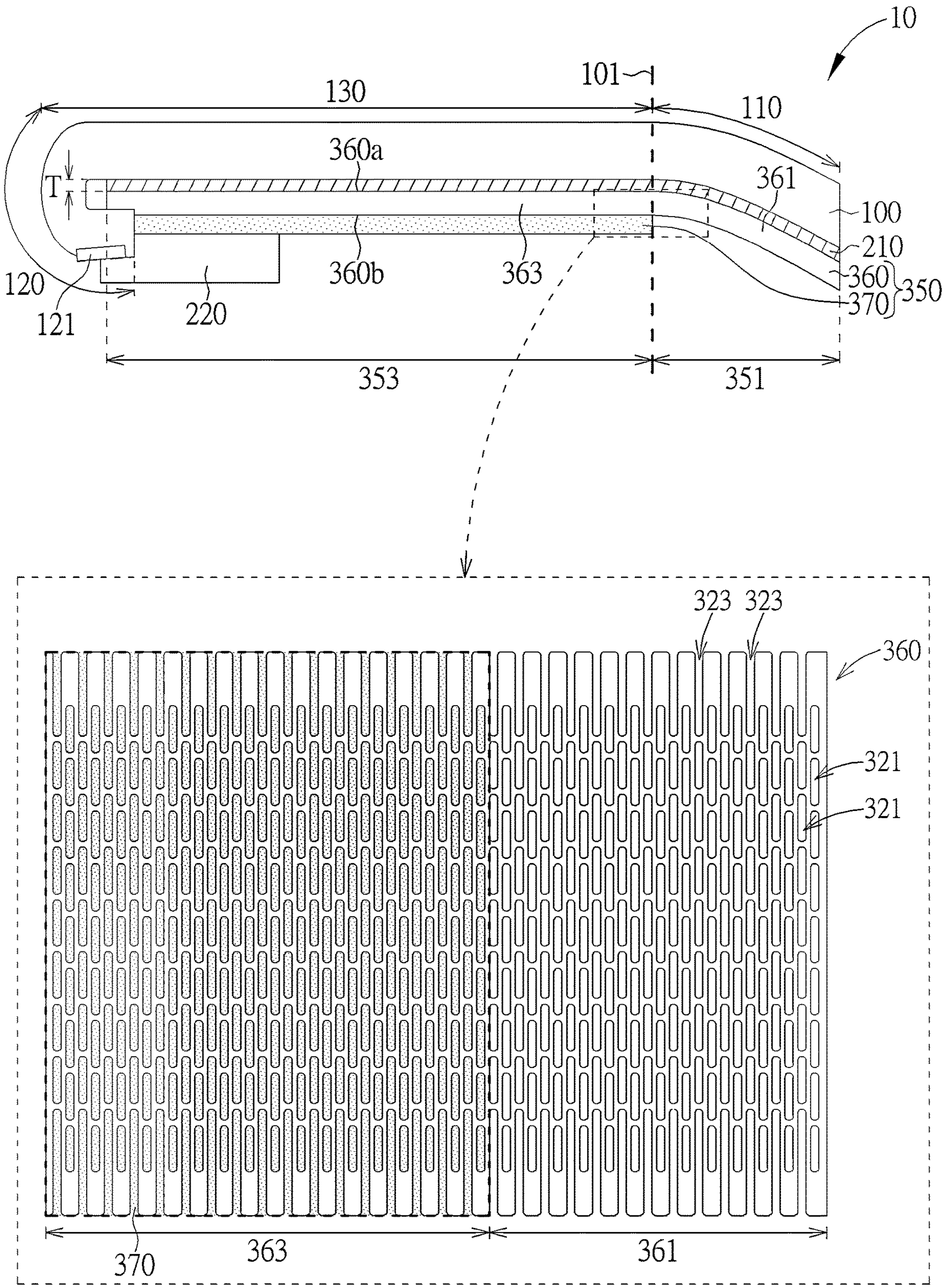
FIG. 10 is a schematic cross-sectional view of an electronic device according to a third embodiment of the present disclosure.

Please refer to FIG. 10, which is a schematic cross-sectional view of an electronic device of a third embodiment of the present disclosure. The electronic device is, for example, a display device 10, which may also include a display panel 100 (rollable display panel), and the display panel 100 may also include a rollable portion 110 and a non-rollable portion 130, in which the similarities will not be repeated. The electronic device includes a support structure 350, and the support structure 350 may also be adhered to the back side of the display panel 100 through the supporting structure glue 210 to improve the stiffness of the display panel 100. The support structure 350 may also include a first area 351 and a second area 353 with different stiffnesses. The first area 351 may have a relatively small stiffness Sb, and the second area 353 may have a relatively large stiffness Sa, to respectively correspond to the rollable portion 110 and the non-rollable portion 130 of the display panel 100 (as shown in FIG. 10).

In detail, the support structure 350 may include a first support structure 360 and a second support structure 370. The surface 360*a* of the first support structure 360 may directly contact the supporting structure glue 210, and the second support structure 370 may be disposed on another surface 360*b* of the first support structure 360. The first support structure 360 further includes a first area 361 and a second area 363 corresponding to the rollable portion 110 and the non-rollable portion 130 respectively, and the second support structure 370 may correspond to the non-rollable portion 130. The detailed features of the first support structure 360 are substantially the same as those of the first support structure 310 of the aforementioned second embodiment. The difference between the two first support structures is that the first area 361 and the second area 363 of the first support structure 360 may be both have a plurality of first openings 321 and a plurality of second openings 323. In addition, the area provided with the second support structure 370 may correspond to the non-rollable portion 130, which may increase the stiffness and strengthen the supportability of the area. In another embodiment, the first area 361 and the second area 363 of the first support structure 360 may not have any openings, and the difference in stiffness of the support structure may be produced by the additional second support structure 370. In other words, the difference in stiffness between the areas of the support structure 350 corresponding to the rollable portion 110 and the non-rollable portion 130 respectively may be produced by the difference in thickness. In another embodiment, the difference in stiffness between the areas of the support structure 350 corresponding to the rollable portion 110 and the area of the non-rollable portion 130 respectively may be produced by the difference in materials. For example, the support structure may include a first area and a second area corresponding to the rollable portion 110 and the non-rollable portion 130, respectively. The material of the first area may be copper with a lower stiffness, and the material of the second area may be stainless steel with a higher stiffness, but not limited thereto.

In the aforementioned configuration, different areas of the support structure 350 (including the first area 351 and the second area 353) may also provide different stiffnesses to satisfy the requirements in stiffness of different portions of the display panel 100 (including the rollable portion 110 and the non-rollable portion 130). It enables the display panel 100 to withstand multiple folding and un-folding, thereby reducing the possibility of permanent deformation.

Figure 11:
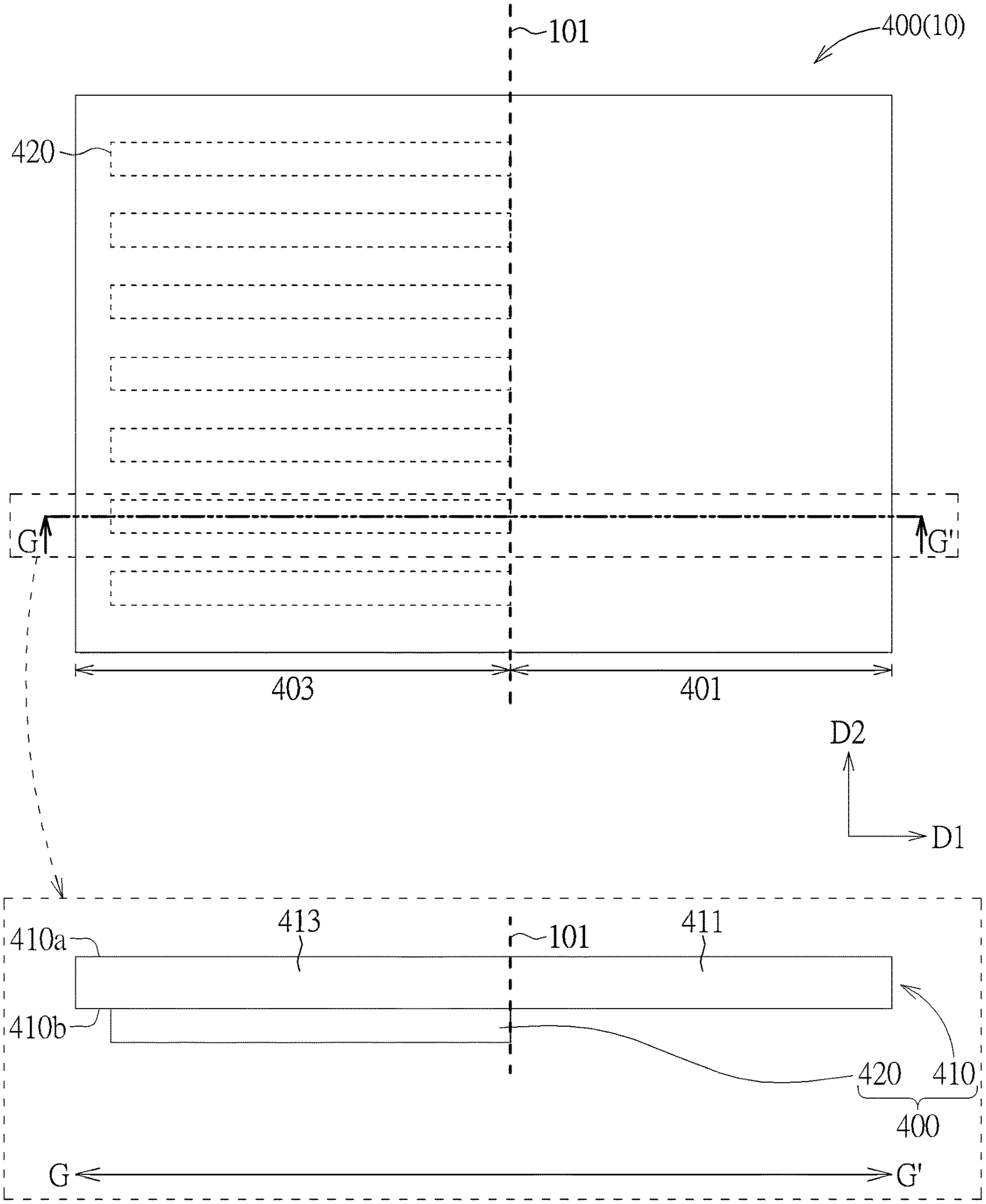
FIG. 11 shows a schematic top view and a schematic cross-sectional view of a support structure of an electronic device according to a fourth embodiment of the present disclosure.

Please refer to FIG. 11, which is a schematic diagram of a support structure of an electronic device of a fourth embodiment of the present disclosure, wherein the bottom of FIG. 11 is a schematic cross-sectional view along the section line G-G'. The electronic device is, for example, a display device 10. The structure of the electronic device is substantially that of the aforementioned embodiments and includes a display panel 100 and a support structure 400, in which the similarities are not repeated. In order to clearly show the appearance of the support structure 400, the display panel 100 is omitted in FIG. 11, but those skilled in the art should refer to the drawings of the aforementioned embodiments to understand the arrangement relationship of the support structure 400 with respect to the display panel 100. The support structure 400 may also include a first area 401 and a second area 403 with different stiffnesses. The first area 401 may have a relatively small stiffness Sb, and the second area 403 may have a relatively large stiffness Sa. The first area 401 and the second area 403 may respectively correspond to the rollable portion 110 and the non-rollable portion 130 of the display panel 100 (as shown in FIG. 1). Therefore, in the present embodiment, the boundary between the first area 401 and the second area 403 of the support structure 400 may substantially overlap the boundary 101 between the rollable portion 110 and the non-rollable portion 130 of the display panel 100, but not limited thereto.

In detail, the support structure 400 may include a first support structure 410 and a plurality of support bars 420. The first support structure 410 has a first surface 410*a* and a second surface 410*b* opposite to each other. The first surface 410*a* of the support structure 400 may be adhered to the display panel 100 through a supporting structure glue (not shown in the drawings of the present embodiment), and the support bars 420 may be disposed on the second surface 410*b* of the first support structure 410. In addition, the first support structure 410 further includes a first area 411 and a second area 413 corresponding to the rollable portion 110 and the non-rollable portion 130, respectively, and the support bars 420 are spaced apart from each other and disposed on the surface of the second area 413 of the first support structure 410 to provide additional support. In the present embodiment, the support bars 420 are, for example, strip-shaped structures extending along the stretching direction D1, but not limited thereto. Those skilled in the art should understand that, in another embodiment, the support bars may extend along the direction D2, or have other structures or patterns that provide additional support.

In the aforementioned configuration, the first area 401 of the support structure 400 may provide a relatively small stiffness Sb, and the second area 403 of the support structure 400 may provide a relatively large stiffness Sa, which satisfy the requirements in stiffness of different portions of the display panel 100 (including the rollable portion 110 and the non-rollable portion 130). It enables the display panel 100 to withstand multiple folding and un-folding, thereby reducing the possibility of permanent deformation.

Figure 12:
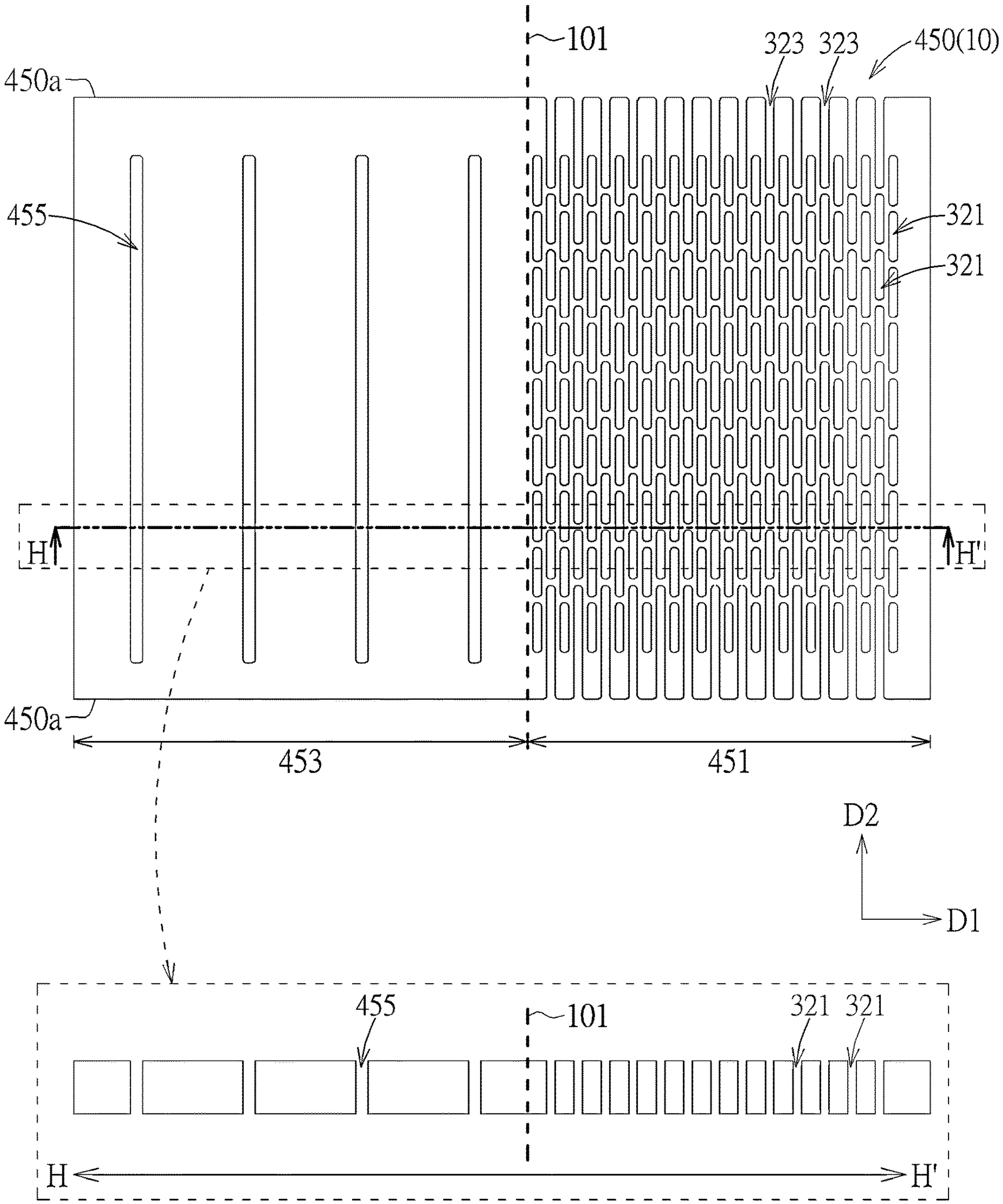
FIG. 12 shows a schematic top view and a schematic cross-sectional view of a support structure of an electronic device according to a fifth embodiment of the present disclosure.

Please refer to FIG. 12, which is a schematic diagram of a support structure of an electronic device of a fifth embodiment of the present disclosure, wherein the bottom of FIG. 12 is a schematic cross-sectional view along the section line H-H'. The electronic device is, for example, a display device 10. The structure of the display device 10 is substantially the same as that of the aforementioned embodiments and includes a display panel 100 and a support structure 450, wherein the similarities will not be repeated. In order to clearly show the appearance of the support structure 450, the display panel 100 is omitted in FIG. 12, but those skilled in the art should refer to the drawings of the aforementioned embodiments to understand the arrangement relationship of the support structure 450 with respect to the display panel 100. The support structure 450 may also include a first area 451 and a second area 453 with different stiffnesses, respectively corresponding to the rollable portion 110 and the non-rollable portion 130 of the display panel 100 (as shown in FIG. 1). Therefore, the boundary between the first area 451 and the second area 453 of the support structure 450 may substantially overlap the boundary 101 between the rollable portion 110 and the non-rollable portion 130 of the display panel 100, but not limited thereto.

In detail, the support structure 450 includes the first area 451 and the second area 453 corresponding to the rollable portion 110 and the non-rollable portion 130 respectively. The first area 451 further includes a plurality of first openings 321 and a plurality of second openings 323 disposed thereon. The specific locations and detailed features of the first openings 321 and the second openings 323 are substantially the same as those of the aforementioned second embodiment and will not be repeated here. The support structure 450 further includes a plurality of third openings 455, and the third openings 455 may be spaced apart from each other and disposed in the second area 453 of the support structure 450. The third openings 455 in the direction D2 may not extend to the two sides 450*a* of the support structure 450 that are in the stretching direction D1, as shown in FIG. 12. In the present embodiment, the third openings 455 are, for example, strip-shaped openings extending along the direction D2, but not limited thereto. Those skilled in the art should understand that, in another embodiment, the third openings may extend along the stretching direction D1, or have other shapes or patterns.

It should be noted that the proportion of the area occupied by the first openings 321 and/or the second openings 323 on the first area 451 may be greater than the proportion of the area occupied by the third openings 455 on the second area 453. Therefore, according to the aforementioned configuration, the first area 451 of the support structure 450 may provide a relatively small stiffness Sb, and the second area 453 of the support structure 450 may provide a relatively large stiffness Sa, which satisfies the requirement in stiffness of different portions of the display panel 100 (including the rollable portion 110 and the non-rollable portion 130). It enables the display panel 100 to withstand multiple folding and un-folding, thereby reducing the possibility of permanent deformation.

Figure 13:
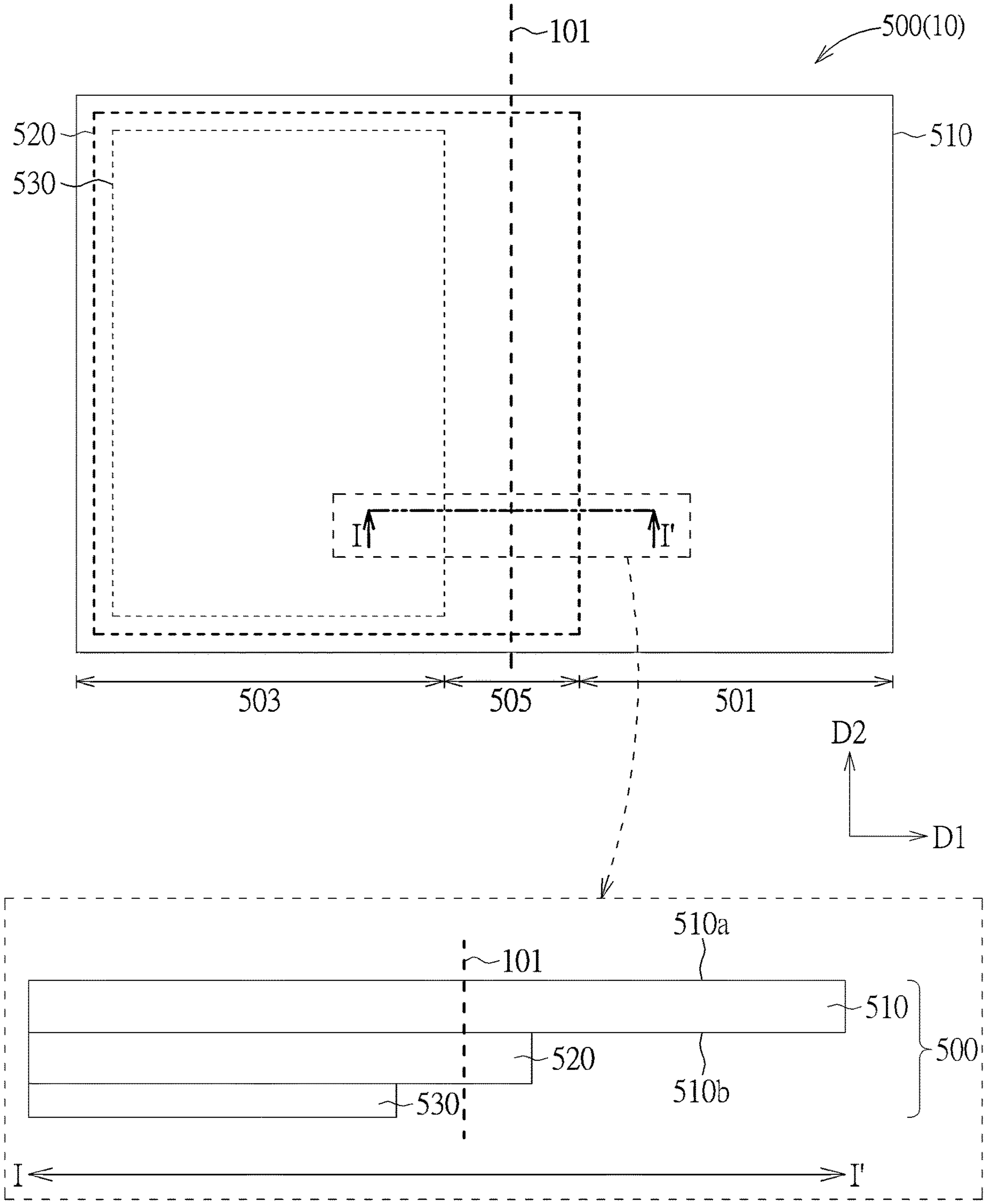
FIG. 13 shows a schematic top view and a schematic cross-sectional view of a support structure of an electronic device according to a sixth embodiment of the present disclosure.

Please refer to FIG. 13, which is a schematic diagram of a support structure of an electronic device of a sixth embodiment of the present disclosure, wherein the bottom of FIG. 13 shows a schematic enlarged cross-sectional view along the section line I-I'. The electronic device is, for example, a display device 10. The structure of the display device 10 is substantially the same as that of the aforementioned embodiments and includes a display panel 100 and a support structure 500, wherein the similarities are not repeated. In order to clearly show the appearance of the support structure 500, the display panel 100 is omitted in FIG. 13, but those skilled in the art should refer to the drawings of the aforementioned embodiments to understand the arrangement relationship between the support structure 500 and the display panel 100. The support structure 500 may include a first area 501, a second area 503, and a third area 505 with different stiffnesses. The first area 501 may have a relatively small stiffness Sb, the second area 503 may have a relatively large stiffness Sa, and the stiffness Sd of the third area 505 is between the stiffness Sb of the first area 501 and the stiffness Sa of the second area 503 (Sa>Sd>Sb). The third area 505 may be disposed between the first area 501 and the second area 503 to serve as a stiffness transition region, thereby reducing the difference in stiffness between the first area 501 and the second area 503.

It should be noted that the third area 505 may correspond to a portion of the display panel 100 that has a small degree of rolling, folding, bending, warping, or bowing, for example, the boundary 101 between the rollable portion 110 and the non-rollable portion 130, and the portion adjacent to the boundary 101. In the present embodiment, the first area 501 may correspond to a part of the rollable portion 110 of the display panel 100, the second area 503 may correspond to a part of the non-rollable portion 130 of the display panel 100, and the third area 505 may correspond to another part of the rollable portion 110, another part of the non-rollable portion 130, and the boundary 101 between the rollable portion 110 and the non-rollable portion 130, as shown in FIG. 13, but not limited thereto. In another embodiment, the first area with a lower stiffness Sb may correspond to a part of the rollable portion 110 of the display panel 100, and the second area with a higher stiffness Sa may correspond to the non-rollable portion 130 of the display panel 100. The third area with the stiffness Sd between the stiffness Sb and the stiffness Sa may correspond to another part of the rollable portion 110. Alternatively, the first area with a lower stiffness Sb may correspond to the rollable portion 110 of the display panel 100, and the second area with a higher stiffness Sa may correspond to a part of the non-rollable portion 130 of the display panel 100, and the third area with the stiffness Sd between the stiffness Sb and the stiffness Sa may correspond to another part of the non-rollable portion 130.

In detail, the support structure 500 may include a first support structure 510, a second support structure 520 and a third support structure 530. The first support structure 510 has a first surface 510*a* and a second surface 510*b* opposite to each other. The first surface 510*a* of the support structure 500 may be adhered to the display panel 100 through, for example, a supporting structure glue (not shown in the drawings of the present embodiment). The second support structure 520 and the third support structure 530 are sequentially disposed on the second surface 510*b* of the first support structure 510. In the present embodiment, the first support structure 510 may correspond to both the rollable portion 110 and the non-rollable portion 130. The second support structure 520 may not correspond to a part of the rollable portion 110, but may correspond to both another part of the rollable portion 110 and the non-rollable portion 130. The third support structure 530 may not correspond to the rollable portion 110 and a part of the non-rollable portion 130, but may correspond to another part of the non-rollable portion 130. In other words, the first area 501 of the support structure 500 is composed of the first support structure 510, such that a relatively small stiffness Sb is provided. The second area 503 of the support structure 500 is composed of a stack of the first support structure 510, the second support structure 520, and the third support structure 530, such that a relatively large stiffness Sa is provided. The third area 505 of the support structure 500 is composed of a stack of the first support structure 510 and the second support structure 520, such that the stiffness Sd of the third area 505 may be between the stiffness Sb of the first area 501 and the stiffness Sa of the second area 503. Under the aforementioned configuration, different areas of the support structure 500 (including the first area 501, the second area 503, and the third area 505) may provide different stiffnesses to satisfy the requirements in stiffness of different portions of the display panel 100. It enables the display panel 100 to withstand multiple folding and un-folding, thereby reducing the possibility of permanent deformation.

Figure 14:
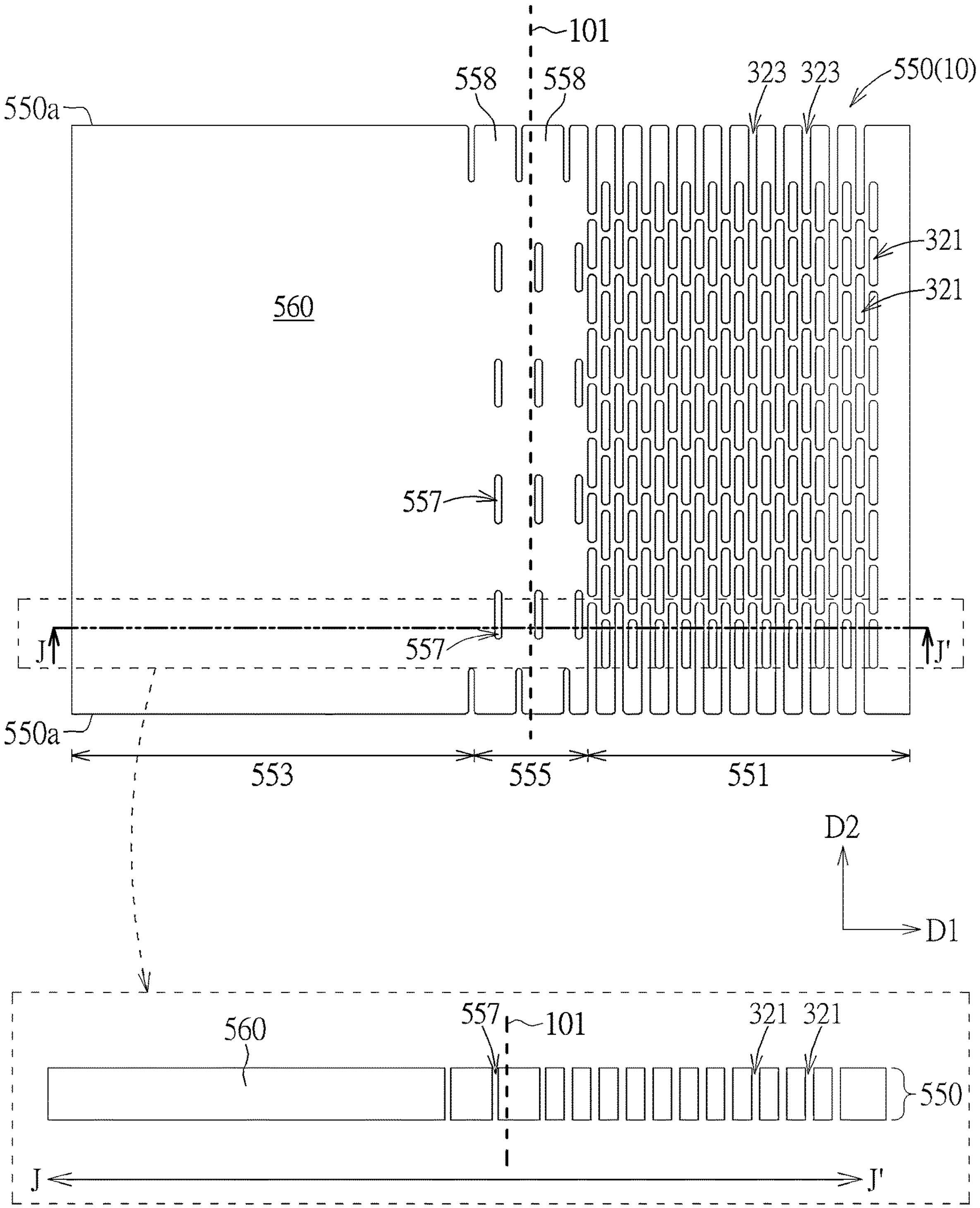
FIG. 14 shows a schematic top view and a schematic cross-sectional view of a support structure of an electronic device according to a seventh embodiment of the present disclosure.

Please refer to FIG. 14, which is a schematic diagram of a support structure of an electronic device of a seventh embodiment of the present disclosure, wherein the bottom of FIG. 14 is a schematic cross-sectional view along the section line J-J'. The electronic device is, for example, a display device 10. The structure of the display device 10 is substantially the same as that of the aforementioned embodiments and includes a display panel 100 and a support structure 550, wherein the similarities will not be repeated. In addition, in order to clearly show the appearance of the support structure 550, the display panel 100 is omitted in FIG. 14, but those skilled in the art should refer to the drawings of the aforementioned embodiments to understand the arrangement relationship of the support structure 550 with respect to the display panel 100. The support structure 550 may also include a first area 551, a second area 553, and a third area 555 with different stiffnesses. The first area 551 may have a relatively small stiffness Sb, and the second area 553 may have a relatively large stiffness Sa. The stiffness Sd of the third area 555 is between the stiffness Sb of the first area 551 and the stiffness Sa of the second area 553 (Sa>Sd>Sb), and may be used as a stiffness transition region. In addition, the arrangements of the first area 551, the second area 553, and the third area 555 respectively corresponding to the portions of the display panel 100 are substantially the same as those of the aforementioned sixth embodiment, and will not be described again.

In detail, the first area 551 of the support structure 550 includes a plurality of first openings 321 and a plurality of second openings 323, wherein the specific locations and detailed features of the first openings 321 and the second openings 323 are substantially the same as those described in the aforementioned second embodiment, and will not be repeated. The second area 553 of the support structure 550 may include an entity unit 560, and the third area 555 of the support structure 550 includes a plurality of third openings 557. The third openings 557 are, for example, spaced apart from each other and extend in the direction D2, and may have substantially the same or different sizes in the stretching direction D1, but not limited thereto. In one embodiment, the third openings (not shown in the drawings) disposed in the third area 555 may have a gradually increasing size (not shown in the drawings) in the stretching direction D1, for example, the third openings may gradually increase in size in the direction from the second area 553 toward the first area 551. In the present embodiment, the third openings 557 are, for example, strip-shaped openings extending in the direction D2, but not limited thereto. Those skilled in the art should understand that, in another embodiment, the third openings may extend along the stretching direction D1, or have other shapes. In addition, a part of the third openings 557 may extend in the direction D2 to the two sides 550*a* of the support structure 550 that are in the stretching direction D1, and a part of the side 550*a* is cut into a plurality of segments 558, as shown in FIG. 14.

It should be noted that the proportion of the area occupied by the first openings 321 and the second openings 323 on the first area 551 may be greater than the proportion of the area occupied by the third openings 557 on the third area 555. Therefore, under the aforementioned configuration, the first area 551 of the support structure 550 may provide a relatively small stiffness Sb, the second area 553 of the support structure 550 may provide a relatively large stiffness Sa, and the stiffness Sd of the third area 555 is between the stiffness Sb of the first area 551 and the stiffness Sa of the second area 553. Therefore, different areas of the support structure 550 (including the first area 551, the second area 553, and the third area 555) may provide different stiffnesses to satisfy the requirements in stiffness of different portions of the display panel 100. It enables the display panel 100 to withstand multiple folding and un-folding, thereby reducing the possibility of permanent deformation.

Figure 15:
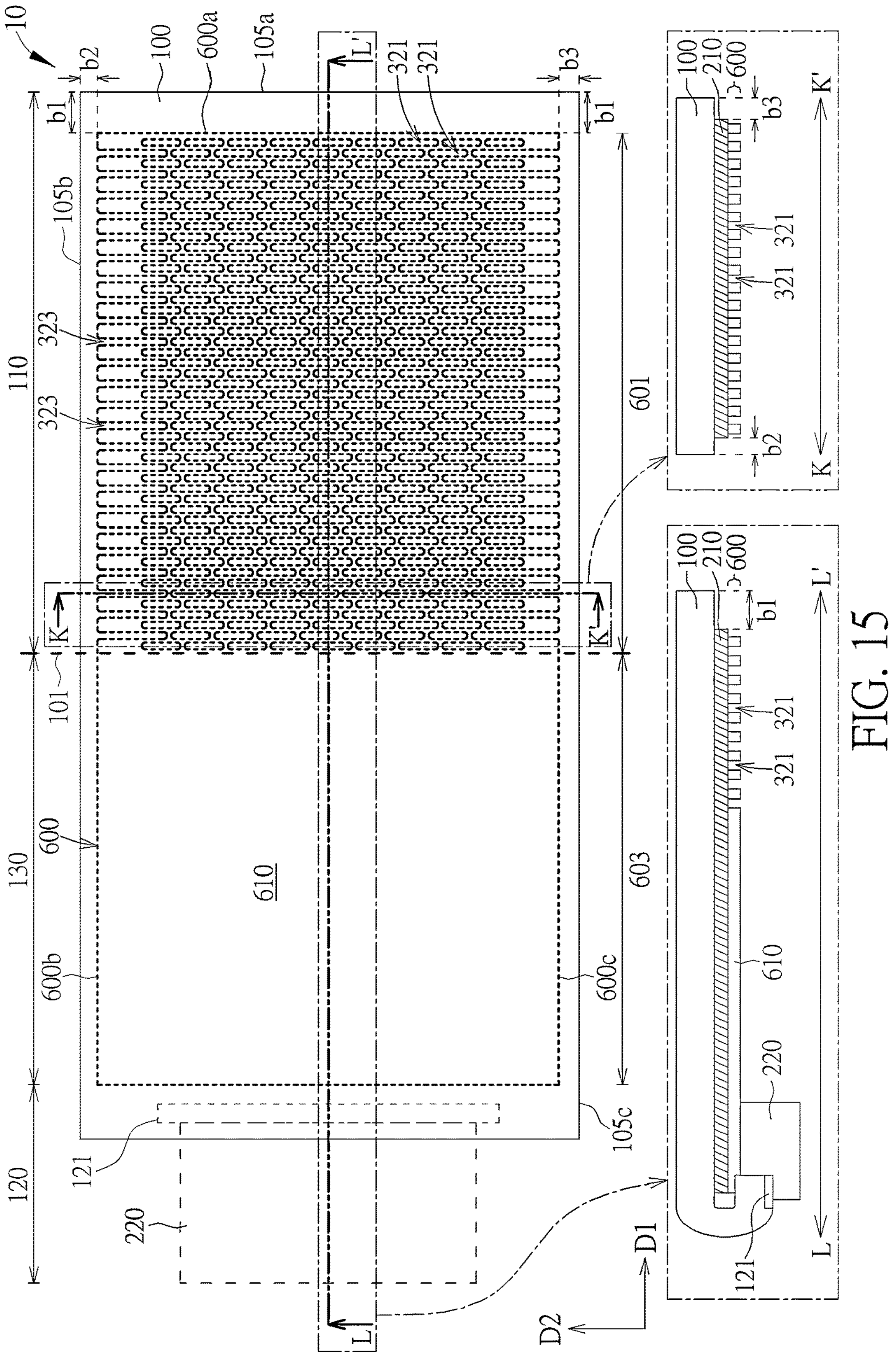
FIG. 15 shows a schematic top view and a schematic cross-sectional view of a display panel of an electronic device according to an eighth embodiment of the present disclosure.

Please refer to FIG. 15, which is a schematic diagram of an electronic device of an eighth embodiment of the present disclosure, wherein the bottom of FIG. 15 shows schematic cross-sectional views along the section line K-K' and the section line L-L'. The electronic device is, for example, a display device 10, which may also include a display panel 100 (such as a rollable display panel), and the display panel 100 also includes a rollable portion 110 and a non-rollable portion 130, wherein the similarities are not repeated. A support structure 600 may be disposed on the back side of the display panel 100, and the support structure 600 may also be adhered to the display panel 100 through the supporting structure glue 210 to improve the stiffness of the display panel 100. In the present embodiment, the support structure 600 may also include a first area 601 and a second area 603 with different stiffnesses. The first area 601 may have a relatively small stiffness Sb, and the second area 603 may have a relatively large stiffness Sa, for corresponding to the rollable portion 110 and the non-rollable portion 130 of the display panel 100 respectively. Therefore, in the present embodiment, the boundary between the first area 601 and the second area 603 of the support structure 600 may substantially overlap the boundary 101 between the rollable portion 110 and the non-rollable portion 130 of the display panel 100, but not limited thereto.

In detail, the first area 601 of the support structure 600 may be further provided with a plurality of first openings 321 and a plurality of second openings 323 disposed thereon. The specific locations and detailed features of the first openings 321 and the second openings 323 are substantially the same as the aforementioned second embodiment, and will not be repeated here. The second area 603 of the support structure 600 includes an entity unit 610. In this configuration, the first area 601 and the second area 603 of the support structure 600 may provide different stiffnesses to satisfy the requirements in stiffness of different portions of the display panel 100. It enables the display panel 100 to withstand multiple folding and un-folding, thereby reducing the possibility of permanent deformation.

It should be noted that when the support structure 600 is disposed, a buffer region may be reserved between the side of the support structure 600 and the side of the display panel 100, such as the region b1 between the side 600*a* of the support structure 600 and the side 105*a* of the display panel 100, the region b2 between the side 600*b* of the support structure 600 and the side 105*b* of the display panel 100, or the region b3 between the side 600*c* of the support structure 600 and the side 105*c* of the display panel 100, as shown in FIG. 15. The width of the region b1 in the stretching direction D1, or the widths of the region b2 and the region b3 in the direction D2 may not be greater than 1 mm (b1, b2, b3≤1 mm), such as 0.2 mm or 0.5 mm, such that the support structure 600 may effectively correspond to each portion of the display panel 100 and satisfy the corresponding requirements in stiffness.

Figure 16:
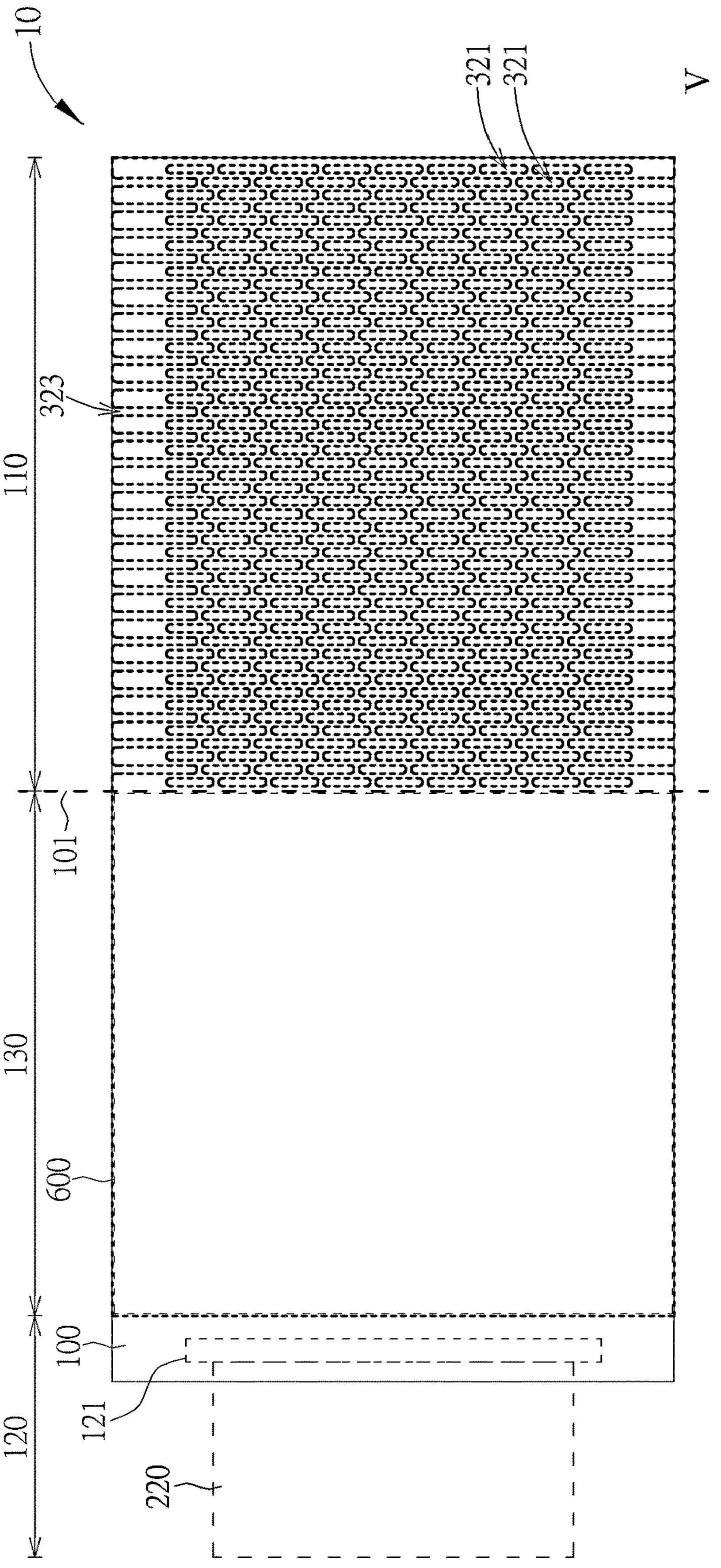
Figure 17:
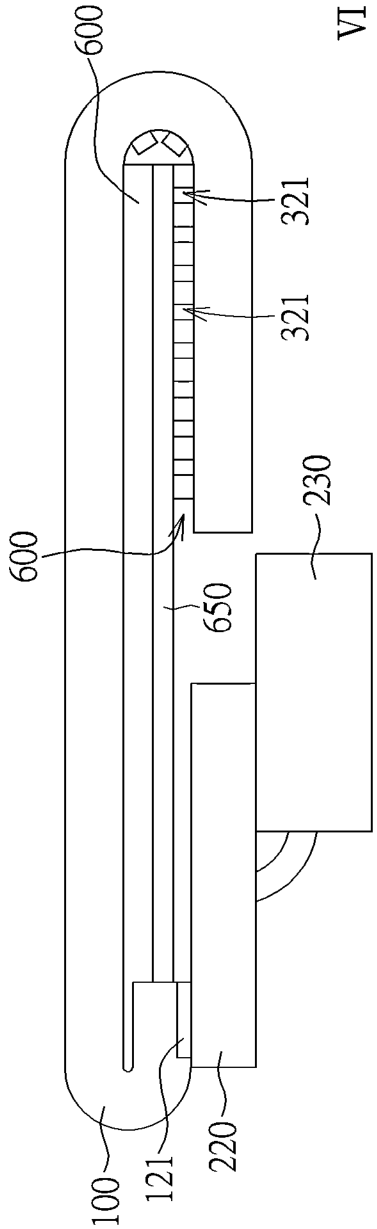

Please refer to FIG. 16 and FIG. 17, which are schematic diagrams of an electronic device of a ninth embodiment of the present disclosure. FIG. 16 illustrates a schematic top view of the electronic device in an unfolding mold V, and FIG. 17 illustrates a schematic cross-sectional view of the electronic device in a folding mold VI. In addition, in order to clearly show the appearance of a support structure of the electronic device, the roller 103 is omitted in FIG. 17, but those skilled in the art should refer to the drawings of the aforementioned embodiments to understand the arrangement relationship of the roller 103 with respect to the display panel 100. The electronic device is, for example, a display device 10, which may also include a display panel 100 (for example, a rollable display panel) and a support structure 600. The structure of the display device 10 is substantially the same as that of the aforementioned eighth embodiment, and will not be repeated. The difference between the electronic devices of this embodiment and the aforementioned embodiments is that a support structure 650 is further disposed under the support structure 600, where the support structure 650 may include a metal material with a heat dissipation function. The material of the support structure 650 may include a stainless steel plate, a copper plate, an aluminum plate, an alloy plate, a composite metal plate or other suitable metal materials, but not limited thereto. In the present embodiment, the support structure 650 may be disposed to correspond to the non-rollable portion 130 of the display panel 100, but not limited thereto. In another embodiment, the support structure (which may include a metal material with heat dissipation function) may be disposed to correspond to both the rollable portion 110 and the non-rollable portion 130. Alternatively, the region of the support structure corresponding to the rollable portion 110 may further include multiple openings corresponding to the first openings 321 and the second openings 323 in detail, but not limited thereto. In addition, the electronic device may further include a power supply 230, which may also be disposed on a portion of the display panel 100 with sufficient stiffness or support, such as the non-rollable portion 130. In the present embodiment, the power supply 230 may be disposed on the back side of the non-rollable portion 130 through the circuit portion 220, as shown in FIG. 16 and FIG. 17. In the configuration, the support structure 600 and the support structure 650 may satisfy the requirements in stiffness of different portions of the display panel 100 to enable the display panel 100 to withstand multiple folding and un-folding, thereby reducing the possibility of permanent deformation. In addition, the support structure 600 and the support structure 650 may further improve the heat dissipation effect of the display panel 100 to enhance the device performance of the display panel 100.

In summary, the electronic devices of the present disclosure further include a support structure disposed under the display panel. Different areas of the support structure may have different stiffnesses. Therefore, the electronic devices satisfy the requirements in stiffness of different portions of the display panel (for example, the rollable portion and the non-rollable portion). It enables the display panel to withstand multiple folding and un-folding, thereby reducing the possibility of permanent deformation. The difference in stiffness of the areas of the support structure may be produced by the difference in structures. For example, the areas of the support structure may be selectively provided with a single-layered or a multi-layered structure, with or without openings, with openings of different sizes, with or without support bars, or composed of stacks of different films. In addition, in the aforementioned embodiments, the differences in stiffness may be produced by the differences in structures of different areas of the support structure, but not limited thereto. Those skilled in the art should easily understand that, in other embodiments, other manners may also be used to produce the difference in stiffness of the support structure. For example, different areas of the support structure may have differences in thickness or material. In this way, regions with larger thickness or poor material ductility (for example, including stainless steel) may have a relatively high stiffness, and regions with smaller thickness or better material ductility (for example, including copper) may have a relatively low stiffness, thereby producing differences in stiffness of the different regions.

In addition, the electronic devices of the present disclosure are not limited to include the aforementioned display devices, and may also include a light-emitting device, an antenna device, a sensing device, or a splicing device, but not limited thereto. The electronic devices may be a non-rectangular, bendable or flexible electronic device, for example, including a flexible light-emitting diode display device. The antenna device may be, for example, a liquid crystal antenna, but not limited thereto. The splicing device may be, for example, a display splicing device or an antenna splicing device, but not limited thereto. The electronic devices may have a driving system, a control system, a light source system, a shelf system or other peripheral systems to support a display device or a spliced display device. It should be noted that the electronic devices may be a variation, any configuration or a combination of the aforementioned devices, but not limited thereto. In addition, in the present disclosure, the term “rollable”, “bendable” or “flexible” means that the electronic devices may be rolled, bent, bowed, folded, unfolded, flexed, or other similar deformations. In the present disclosure, the term “non-rectangular” means that the appearance of the electronic device is non-rectangular, or the pixel array included in the electronic device has a non-rectangular overall appearance.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:

a panel, having a first portion and a second portion, wherein the first portion is rollable;

a first support structure, supporting the panel and having a first region and a second region, wherein the first region corresponds to the first portion and the second region corresponds to the second portion; and a second support structure supporting the second portion of the panel, wherein the first support structure is disposed between the panel and the second support structure;

wherein the first support structure comprises a plurality of openings in the first region, and an entity element in the first region and the second region, wherein an area of the entity element is greater than an area of the second support structure.

2. The electronic device according to claim 1, wherein the entity element in the first region comprises a plurality of the segments and a plurality of spacers, wherein the plurality of segments adjacent to an edge of the entity element, one of the plurality of spacers is disposed between two adjacent ones of the plurality of openings, and a gap is disposed between two adjacent ones of the plurality of segments.

3. The electronic device according to claim 2, wherein a width of one of the plurality of the segments in a stretching direction of the panel is greater than a width of one of a plurality of spacers in the stretching direction of the panel.

4. The electronic device according to claim 2, wherein a width of one of the plurality of spacers in a stretching direction of the panel is smaller than a width of one of the plurality of openings in the stretching direction of the panel.

5. The electronic device according to claim 4, wherein the plurality of openings is extended along a direction being perpendicular to the stretching direction of the panel.

6. The electronic device according to claim 1, wherein a width of the first support structure in a stretching direction of the panel is greater than a width of the second support structure in the stretching direction of the panel.

7. The electronic device according to claim 1, further comprising a glue disposed between the first support structure and the panel.

8. The electronic device according to claim 1, wherein the first support structure and the second support structure comprise different materials.

9. The electronic device according to claim 1, wherein at least one of the first support structure and the second support structure comprises a metal material.

10. The electronic device according to claim 1, wherein a thickness of the first support structure is different from a thickness of the second support structure.

* * * * *